US012135941B2

(12) United States Patent
Zeng et al.

(10) Patent No.: US 12,135,941 B2
(45) Date of Patent: Nov. 5, 2024

(54) MISSING SEMANTICS COMPLEMENTING METHOD AND APPARATUS

(71) Applicant: Huawei Technologies Co., Ltd., Shenzhen (CN)

(72) Inventors: Yulong Zeng, Shenzhen (CN); Jiansheng Wei, Shenzhen (CN); Yasheng Wang, Shenzhen (CN); Liqun Deng, Shenzhen (CN); Anqi Cui, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 404 days.

(21) Appl. No.: 17/530,197

(22) Filed: Nov. 18, 2021

(65) Prior Publication Data

US 2022/0075958 A1    Mar. 10, 2022

Related U.S. Application Data

(63) Continuation of application No. PCT/CN2020/087925, filed on Apr. 29, 2020.

(30) Foreign Application Priority Data

May 21, 2019  (CN) .......................... 201910428203.3

(51) Int. Cl.
  *G06F 40/30*   (2020.01)
  *G06F 40/289*  (2020.01)
  *G06N 5/01*    (2023.01)
(52) U.S. Cl.
  CPC ............ *G06F 40/30* (2020.01); *G06F 40/289* (2020.01); *G06N 5/01* (2023.01)
(58) Field of Classification Search
  None
  See application file for complete search history.

(56) References Cited

U.S. PATENT DOCUMENTS 11,748,713 B1*  9/2023  Tran ................... G06N 5/02
                                          705/7.18
2005/0197828 A1*  9/2005  McConnell ......... G06F 40/169
                                          704/9

(Continued)

FOREIGN PATENT DOCUMENTS

CN    102455786 A    5/2012
CN    103605492 A    2/2014

(Continued)

OTHER PUBLICATIONS

Yan Ke et al., "Primary Study On Computerised Automatic Marking of English Recitation Proficiency," Computer Applications and Software, vol. 27, No. 7, Total 5 pages, China Academic Journal Electronic Publishing House (Jul. 2010). With English Abstract.

*Primary Examiner* — Jonathan C Kim
(74) *Attorney, Agent, or Firm* — Leydig, Voit & Mayer, Ltd.

(57) ABSTRACT

A missing semantics complementing method in the field of natural language processing in the artificial intelligence field is provided. The method includes: obtaining a question statement and a historical dialog statement; resolving a to-be-resolved item in the question statement based on the historical dialog statement and location information of the to-be-resolved item, to obtain a resolved question statement; determining whether a component in the question statement is ellipted, and if a component in the question statement is ellipted, complementing the ellipted component based on the historical dialog statement, to obtain a question statement after ellipsis resolution; merging the resolved question statement and the question statement after ellipsis resolution, to obtain a merged question statement; and determining a target complemented question statement from the resolved (Continued)

question statement, the question statement after ellipsis resolution, and the merged question statement.

14 Claims, 10 Drawing Sheets

(56) References Cited

U.S. PATENT DOCUMENTS

| | | | | |
|---|---|---|---|---|
| 2009/0326919 | A1* | 12/2009 | Bean | G06F 40/289 |
| | | | | 704/9 |
| 2011/0112823 | A1* | 5/2011 | Ylonen | G06F 40/211 |
| | | | | 704/9 |
| 2011/0119047 | A1* | 5/2011 | Ylonen | G06F 40/30 |
| | | | | 704/9 |
| 2011/0119049 | A1* | 5/2011 | Ylonen | G06F 40/211 |
| | | | | 704/9 |
| 2012/0183935 | A1* | 7/2012 | Hamada | G06F 40/268 |
| | | | | 434/167 |
| 2015/0032444 | A1* | 1/2015 | Hamada | G06F 40/30 |
| | | | | 704/9 |
| 2015/0142704 | A1* | 5/2015 | London | G10L 15/1822 |
| | | | | 706/11 |
| 2016/0253309 | A1* | 9/2016 | Zhao | G06F 40/211 |
| | | | | 704/9 |
| 2016/0321617 | A1* | 11/2016 | Shastri | G06Q 10/1095 |
| 2017/0169115 | A1* | 6/2017 | Shen | G06F 16/243 |
| 2017/0371860 | A1* | 12/2017 | McAteer | G06F 40/169 |
| 2018/0075135 | A1* | 3/2018 | Dole | G06N 5/013 |
| 2018/0233141 | A1* | 8/2018 | Solomon | G06N 20/00 |
| 2018/0260680 | A1* | 9/2018 | Finkelstein | G06N 5/04 |
| 2018/0293221 | A1* | 10/2018 | Finkelstein | G06N 20/00 |
| 2018/0300306 | A1* | 10/2018 | Kaeser | G06F 40/56 |
| 2019/0042559 | A1* | 2/2019 | Allen | G06F 16/9024 |
| 2019/0171713 | A1* | 6/2019 | Zang | G06F 16/00 |
| 2019/0188257 | A1* | 6/2019 | Iida | G06N 3/045 |
| 2021/0065569 | A1* | 3/2021 | Arvindam | G06F 40/30 |
| 2021/0174022 | A1* | 6/2021 | Ishikawa | G06F 40/211 |
| 2022/0075958 | A1* | 3/2022 | Zeng | G06F 16/35 |

FOREIGN PATENT DOCUMENTS

| | | |
|---|---|---|
| CN | 105373527 A | 3/2016 |
| CN | 105589844 A | 5/2016 |
| CN | 107122346 A | 9/2017 |
| CN | 107305550 A | 10/2017 |
| CN | 107402913 A | 11/2017 |
| CN | 107632979 A | 1/2018 |
| CN | 108053839 A | 5/2018 |
| CN | 108334487 A | 7/2018 |
| CN | 109344238 A | 2/2019 |
| CN | 109344830 A | 2/2019 |
| CN | 109522419 A | 3/2019 |
| CN | 109726389 A | 5/2019 |
| IN | 108647207 A | 10/2018 |

* cited by examiner

MISSING SEMANTICS COMPLEMENTING METHOD AND APPARATUS

CROSS-REFERENCE TO RELATED APPLICATIONS

This application is a continuation of International Application No. PCT/CN2020/087925, filed on Apr. 29, 2020, which claims priority to Chinese Patent Application No. 201910428203.3, filed on May 21, 2019. The disclosures of the aforementioned applications are hereby incorporated by reference in their entireties.

TECHNICAL FIELD

The present disclosure relates to the field of artificial intelligence, and in particular, to a missing semantics complementing method and apparatus.

BACKGROUND

Artificial intelligence (AI) is a theory, a method, a technology, or an application system that simulates, extends, and expands human intelligence by using a digital computer or a machine controlled by the digital computer, to perceive an environment, obtain knowledge, and achieve an optimal result by using the knowledge. In other words, the artificial intelligence is a branch of computer science, and is intended to understand essence of intelligence and produce a new intelligent machine that can react in a manner similar to the human intelligence. The artificial intelligence is to study design principles and implementation methods of various intelligent machines, so that the machines have perceiving, inference, and decision-making functions.

With continuous development of artificial intelligence technologies, a natural language human-machine interaction system that enables human-machine interaction by using a natural language becomes increasingly important. The human-machine interaction by using the natural language requires the system to recognize specific meanings of the human natural language. Usually, the system extracts key information from a natural language sentence to recognize a specific meaning of the sentence.

In a natural language dialog, a coreference and an ellipsis are common language phenomena. In a spoken dialog system or an interactive question and answer system, through the coreference and the ellipsis, a user does not always need to use a sentence that includes a complete semantics meaning, so that expression is more concise and natural. However, for natural language understanding, use of the coreference and the ellipsis may result in a loss of syntax or semantics components of a sentence. Therefore, coreferred and ellipted content needs to be restored and complemented. It is important to build an interactive, smooth, and natural dialog system by using techniques of coreference resolution and ellipsis restoration.

There are a plurality of manners for expressing Chinese language. Therefore, recognition and resolution of the coreference and recognition and restoration of the ellipsis are great challenges for a human-machine dialog system.

SUMMARY

Embodiments of the present disclosure provide a missing semantics complementing method and apparatus, which helps improve accuracy and efficiency of complementing missing semantics of a question statement.

According to a first aspect, an embodiment of the present disclosure provides a missing semantics complementing method, including:

obtaining a historical dialog statement and a question statement input by a user; obtaining location information of a to-be-resolved item in the question statement, and resolving the to-be-resolved item in the question statement based on the historical dialog statement and the location information of the to-be-resolved item, to obtain a resolved question statement; determining whether a component in the question statement is ellipted, and if determining that a component in the question statement is ellipted, complementing the ellipted component based on the historical dialog statement, to obtain a question statement after ellipsis resolution; merging the resolved question statement and the question statement after ellipsis resolution, to obtain a merged question statement; and determining a target complemented question statement from the resolved question statement, the question statement after ellipsis resolution, and the merged question statement, where the target complemented question statement is a question statement, in the resolved question statement, the question statement after ellipsis resolution, and the merged question statement, with a highest stem sentence integrity degree and a highest probability that all words in a sentence form one sentence. This method can improve, by performing coreference resolution on the question statement and complementing the missing component, accuracy and effect of complementing missing semantics. This method is not only applicable to a scenario of zero pronouns, but also applicable to a scenario in which another component is ellipted. In addition, the resolved question statement and the question statement after ellipsis resolution are merged to obtain the merged question statement. A question statement that is finally complemented is obtained from the resolved question statement, the question statement after ellipsis resolution, and the merged question statement. This avoids a problem that there is an error between the resolved question statement and the question statement after ellipsis resolution.

In a feasible embodiment, the obtaining location information of a to-be-resolved item in the question statement includes:

obtaining a word number sequence and a part-of-speech number sequence of the question statement, where the word number sequence includes a number corresponding to each word in the question statement, and the part-of-speech number sequence includes a number corresponding to a part of speech of each word in the question statement; and inputting the word number sequence and the part-of-speech number sequence of the question statement into a first sequence labeling model for calculation, to obtain the location information of the to-be-resolved item.

Accuracy of coreference localization is improved by introducing the sequence labeling model used for the coreference localization, and some pronouns that do not need to be resolved are excluded.

In a feasible embodiment, the historical dialog statement includes a previous statement of the question statement, and the resolving the to-be-resolved item in the question statement based on the historical dialog statement and the location information of the to-be-resolved item, to obtain a resolved question statement includes:

obtaining one or more candidate antecedents from the previous statement of the question statement, where the candidate antecedent is a noun or a noun phrase in the previous statement; scoring each of the one or more candidate antecedents by using a resolution model, to obtain a score of each candidate antecedent; selecting, from the one or more candidate antecedents, candidate antecedents whose scores are higher than a first threshold; and resolving the to-be-resolved item in the question statement by using a candidate antecedent with a highest score in the candidate antecedents whose scores are higher than the first threshold, to obtain the resolved question statement.

In a feasible embodiment, the determining whether a component in the question statement is ellipted includes:

determining whether a stem sentence component in the question statement is ellipted; determining whether a notional word that is in the question statement and that is corresponding to an attribute word is ellipted; or determining whether a general component in the question statement is ellipted.

In a feasible embodiment, the historical dialog statement includes the previous statement of the question statement, and the determining whether a stem sentence component in the question statement is ellipted includes:

determining whether a sentence pattern of the question statement and a sentence pattern of the previous statement meet a preset condition, or determining whether a body of the sentence pattern of the question statement is a proper subset of the previous statement; if determining that the sentence pattern of the question statement and the sentence pattern of the previous statement meet the preset condition, or determining that a stem of the sentence pattern of the question statement is the proper subset of the previous statement, determining whether there is a same-type relationship between a phrase in the question statement and a phrase in the previous statement; and if there is the same-type relationship between the phrase in the question statement and the phrase in the previous statement, determining that the stem sentence component in the question statement is ellipted.

In a feasible embodiment, the preset condition includes: the sentence pattern of the previous statement is an interrogative sentence, and the sentence pattern of the question statement is an interrogative sentence or the body of the question statement is a combination of "what about + noun phrase?"; or the sentence pattern of the previous statement is a declarative sentence, and the sentence pattern of the question statement is an interrogative sentence or the body of the question statement is a combination of "what about + noun phrase?" or a combination of "noun phrase?". The missing stem sentence component can be detected by introducing targeted rule-based sentence component loss detection, and the missing stem sentence component can be complemented. This improves a complementation effect.

In a feasible embodiment, the determining whether a body of the sentence pattern of the question statement is a proper subset of the previous statement includes:

extracting a stem of the previous statement and the stem of the question statement; and determining whether a non-noun phrase part in the stem of the question statement is the proper subset of the stem of the previous statement.

In a feasible embodiment, the determining whether a notional word that is in the question statement and that is corresponding to an attribute word is ellipted includes:

removing a meaningless word from a sentence head of the question statement, to obtain a processed question statement; determining whether a sentence head word in the processed question statement is the attribute word; and if the sentence head word in the processed question statement is the attribute word, determining that the notional word that is in the question statement and that is corresponding to the attribute word is ellipted. A loss of the notional word corresponding to the attribute word in the sentence can be detected by introducing targeted loss detection of the notional word corresponding to the attribute word, and the notional word corresponding to the attribute word is complemented. This improves the effect of complementing missing semantics.

In a feasible embodiment, the determining whether a general component in the question statement is ellipted includes:

obtaining the part-of-speech number sequence and the word number sequence of each word in the question statement, where the word number sequence includes the number corresponding to each word in the question statement, and the part-of-speech number sequence includes the number corresponding to the part of speech of each word in the question statement; and inputting the word number sequence and the part-of-speech number sequence of each word into a second sequence labeling model for calculation, to obtain location information of the ellipted general component in the question statement. The effect of complementing missing semantics is improved by introducing sequence labeling model-based general ellipsis detection and performing targeted complementation.

In conclusion, more types of ellipses can be detected by introducing the rule-based stem sentence component loss detection, the loss detection of the notional word corresponding to the attribute word, and the sequence labeling model-based general ellipsis detection, and targeted complementation can be performed. This achieves a better ellipsis complementation effect.

In a feasible embodiment, the complementing the ellipted component based on the historical dialog statement, to obtain a question statement after ellipsis resolution includes:

retaining an overall structure of the previous statement, and replacing the phrase in the previous statement with the phrase in the question statement, to obtain the question statement after ellipsis resolution. There is the same-type relationship between the phrase in the previous statement and the phrase in the question statement.

In a feasible embodiment, the historical dialog statement includes the previous statement of the question statement, and the complementing the ellipted component based on the historical dialog statement, to obtain a question statement after ellipsis resolution includes:

obtaining one or more candidate notional words in the previous statement; scoring each candidate notional word in the one or more candidate notional words in the previous statement by using a complementation model, to obtain a score of each candidate notional word; obtaining, from the one or more candidate notional words, candidate notional words whose scores are higher than a second threshold; and complementing, based on a candidate notional word with a highest score in the candidate notional words whose scores are higher than the second threshold, the notional word corresponding to the ellipted attribute word in the question statement, to obtain the question statement after ellipsis resolution.

In a feasible embodiment, the historical dialog statement includes the previous statement of the question statement, and the complementing the ellipted component based on the historical dialog statement to obtain a question statement after ellipsis resolution includes:

scoring each noun/noun phrase in one or more nouns/noun phrases in the previous statement by using a complementation model, to obtain a score of each noun/noun phrase; obtaining, from the one or more nouns/noun phrases, nouns/noun phrases whose scores are higher than a third threshold; and complementing the ellipted general component in the question statement based on a noun/noun phrase with a highest score in the nouns/noun phrases whose scores are higher than the third threshold, to obtain the question statement after ellipsis resolution.

A CNN-based resolution model and a CNN-based complementation model are introduced to resolve a to-be-resolved location in the question statement and complement the ellipted component. This resolves a problem in a conventional technology that a complementation error is caused because only a lexical co-occurrence frequency is used to determine complementation, and semantic similarities between to-be-complemented question statements and candidate words can be better mined from massive question and answer corpora. This improves the complementation effect.

In a feasible embodiment, the determining a target complemented question statement from the resolved question statement, the question statement after ellipsis resolution, and the merged question statement includes:

scoring each of the resolved question statement, the question statement after ellipsis resolution, and the merged question statement, to obtain an integrity score and a possibility score of each question statement, where the integrity score is used to represent an integrity degree of a subject, a verb, and an object of a stem of the statement, and the possibility score is used to represent a probability that all words in the statement form one sentence; performing weighted summation on the integrity score and the possibility score of each question statement, to obtain a weighted score of the question statement; and determining the question statement with a highest weighted score as the target complemented question statement. The resolved question statement and the question statement after ellipsis resolution are merged to obtain the merged question statement. A question statement that is finally complemented is obtained from the resolved question statement, the question statement after ellipsis resolution, and the merged question statement, to evaluate an overall effect of a plurality of complemented question statements. This avoids a problem that there is an error between the resolved question statement and the question statement after ellipsis resolution, and improves the complementation effect.

In a feasible embodiment, the missing semantics complementing method further includes:

determining, as a candidate complementation item, a candidate antecedent that is in the candidate antecedents whose scores are higher than the first threshold and whose absolute value of a difference between a score and the highest score is less than a fourth threshold, and storing the candidate complementation item in a candidate table; determining, as a candidate complementation item, a candidate noun or noun phrase that is in candidate nouns or noun phrases whose scores are higher than the second threshold and whose absolute value of a difference between a score and the highest score is less than a fifth threshold, and storing the candidate complementation item in the candidate table; or determining, as a candidate complementation item, a candidate noun or noun phrase that is in the candidate nouns or noun phrases whose scoring results are higher than the third threshold and whose absolute value of a difference between a scoring result and a highest scoring result is less than a sixth threshold, and storing the candidate complementation item in the candidate table.

In a feasible embodiment, the missing semantics complementing method further includes:

if the candidate table includes the candidate complementation item, performing a clarification operation, where the performing a clarification operation includes:

generating a query statement based on the candidate complementation item, and initiating a query dialog, where the query statement includes the candidate complementation item; obtaining a user answer statement, and obtaining, from the answer statement, a candidate complementation item selected by the user; and if the candidate complementation item selected by the user is consistent with the candidate complementation item in the candidate table, modifying the target complemented question statement based on the candidate complementation item selected by the user, to obtain a modified question statement.

In a feasible embodiment, the missing semantics complementing method further includes:

obtaining, from a local database or a third-party server, an answer to the target complemented question statement or the modified question statement, and generating a reply statement based on the answer.

In a feasible embodiment, the missing semantics complementing method further includes:

determining, according to a syntax rule, a sentence pattern, and a historical candidate complementation item, whether the user initiates an error correction dialog; if determining that the user initiates the error correction dialog, extracting a candidate option item from the error correction dialog, and modifying the target complemented question statement or the modified question statement based on the candidate option item, to obtain a new question statement; and generating a new reply statement for the new question statement.

A clarification mechanism and an error correction mechanism are introduced, and an existing complementation model and an existing sequence labeling model can be updated based on user feedback, to continuously optimize the complementation effect.

In a feasible embodiment, the missing semantics complementing method further includes:

after the question statement is obtained, performing preprocessing on the question statement, including but not limited to word segmentation, part-of-speech tagging, sentence problem type identification, stem sentence extraction, and the like.

In a feasible embodiment, the missing semantics complementing method further includes:

after the clarification operation or the error correction is performed, generating a training corpus based on the question statement, the historical dialog statement, the modified question statement, or the new question statement, to update the complementation model and the resolution model.

According to a second aspect, a complementing apparatus is provided. The apparatus includes modules configured to perform the method in the first aspect.

According to a third aspect, a complementing apparatus is provided. The apparatus includes: a memory, configured to store a program; and a processor, configured to execute the program stored in the memory. When the program stored in the memory is executed, the processor is configured to perform the method in the first aspect.

According to a fourth aspect, a computer-readable medium is provided. The computer-readable medium stores program code to be executed by a device, and the program code includes instructions used to perform the method in the first aspect.

According to a fifth aspect, a computer program product including instructions is provided. When the computer program product is run on a computer, the computer is enabled to perform the method in the first aspect.

According to a sixth aspect, a chip is provided. The chip includes a processor and a data interface. The processor reads, through the data interface, instructions stored in a memory, to perform the method in the first aspect.

Optionally, in an implementation, the chip may further include the memory. The memory stores the instructions, the processor is configured to execute the instructions stored in the memory, and when executing the instructions, the processor is configured to perform the method in the first aspect.

According to a seventh aspect, an electronic device is provided. The electronic device includes the apparatus in the second aspect or the third aspect.

These aspects or other aspects of the present disclosure are clearer and more comprehensible in descriptions of the following embodiments.

BRIEF DESCRIPTION OF DRAWINGS

To describe the technical solutions in embodiments of the present disclosure or in the conventional technology more clearly, the following briefly describes the accompanying drawings required for describing the embodiments or the conventional technology. It is clearly that the accompanying drawings in the following description show merely some embodiments of the present disclosure, and a person of ordinary skill in the art may derive other drawings from these accompanying drawings without creative efforts.

DESCRIPTION OF EMBODIMENTS

The following describes the technical solutions in embodiments of the present disclosure with reference to the accompanying drawings in the embodiments of the present disclosure. It is clearly that the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Scenario Description:

As shown in FIG. TA, a natural language processing system includes user equipment and a data processing device.

The user equipment includes a user and intelligent terminals such as a mobile phone, a personal computer, or an information processing center. The user equipment initiates natural language data processing. As an initiator of a request for language questioning and answering, querying, or the like, the user usually initiates the request by using the user equipment.

The data processing device may be a device or a server that has a data processing function, for example, a cloud server, a network server, an application server, or a management server. The data processing device receives, through an interaction interface, a question of a query statement, voice, text, or the like from the intelligent terminal, and then performs language data processing, by using a memory storing data and a processor processing data, including machine learning, deep learning, searching, inference, decision-making, or the like. The memory may be a general name, including a local storage and a database storing historical data. The database may reside in the data processing device, or may reside in another network server.

Figure 1A:
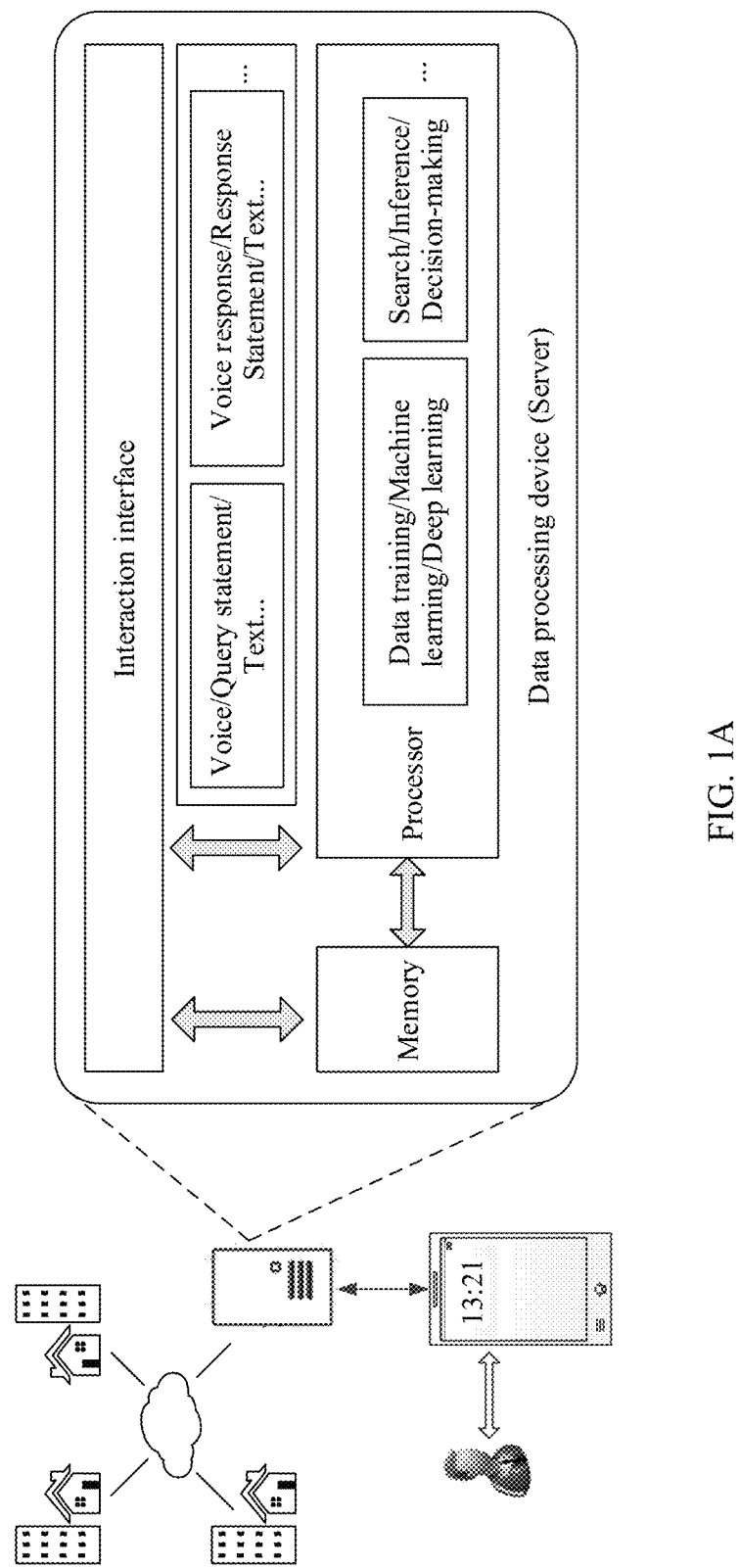
FIG. 1A shows a natural language processing system according to an embodiment of the present disclosure.
Figure 1B:
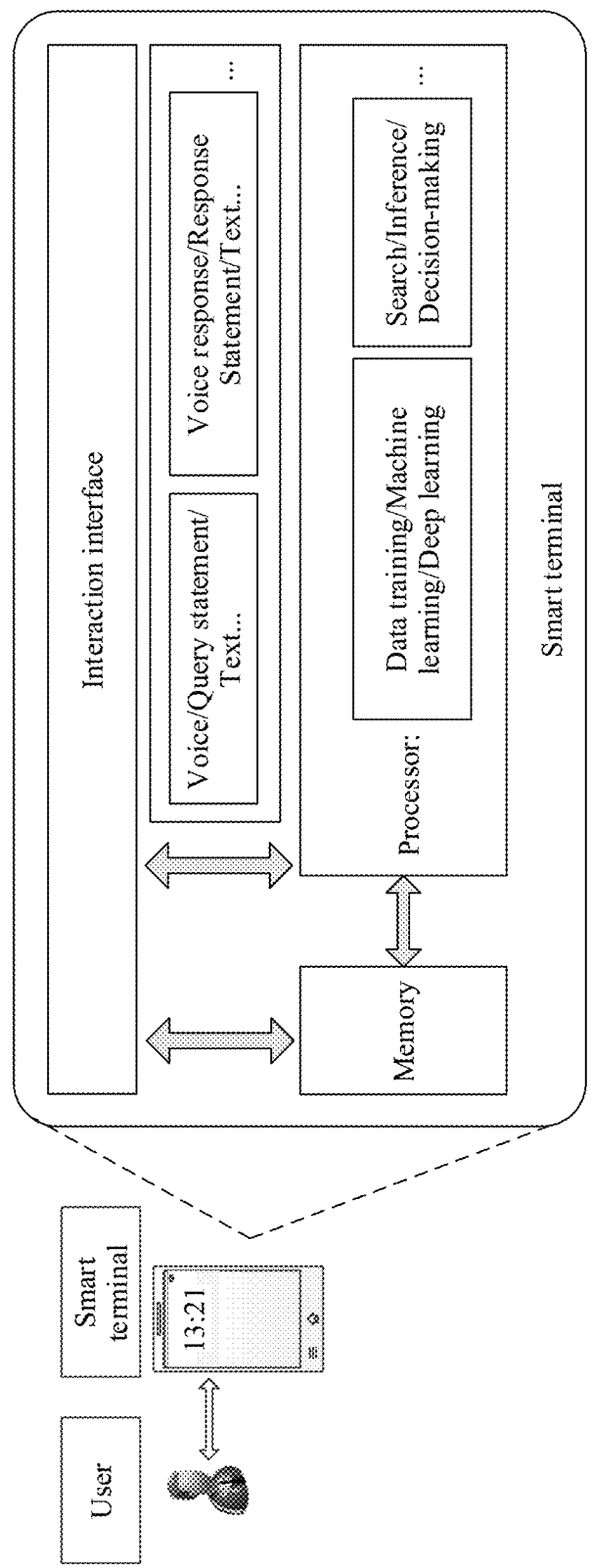
FIG. 1B shows another natural language processing system according to an embodiment of the present disclosure.

FIG. 1B shows another application scenario of a natural language processing system. In this scenario, an intelligent terminal directly serves as a data processing device, directly receives an input from a user, and directly performs processing by using hardware of the intelligent terminal. A specific process is similar to that in FIG. TA, and reference may be made to the foregoing description. Details are not described herein again.

Figure 1C:
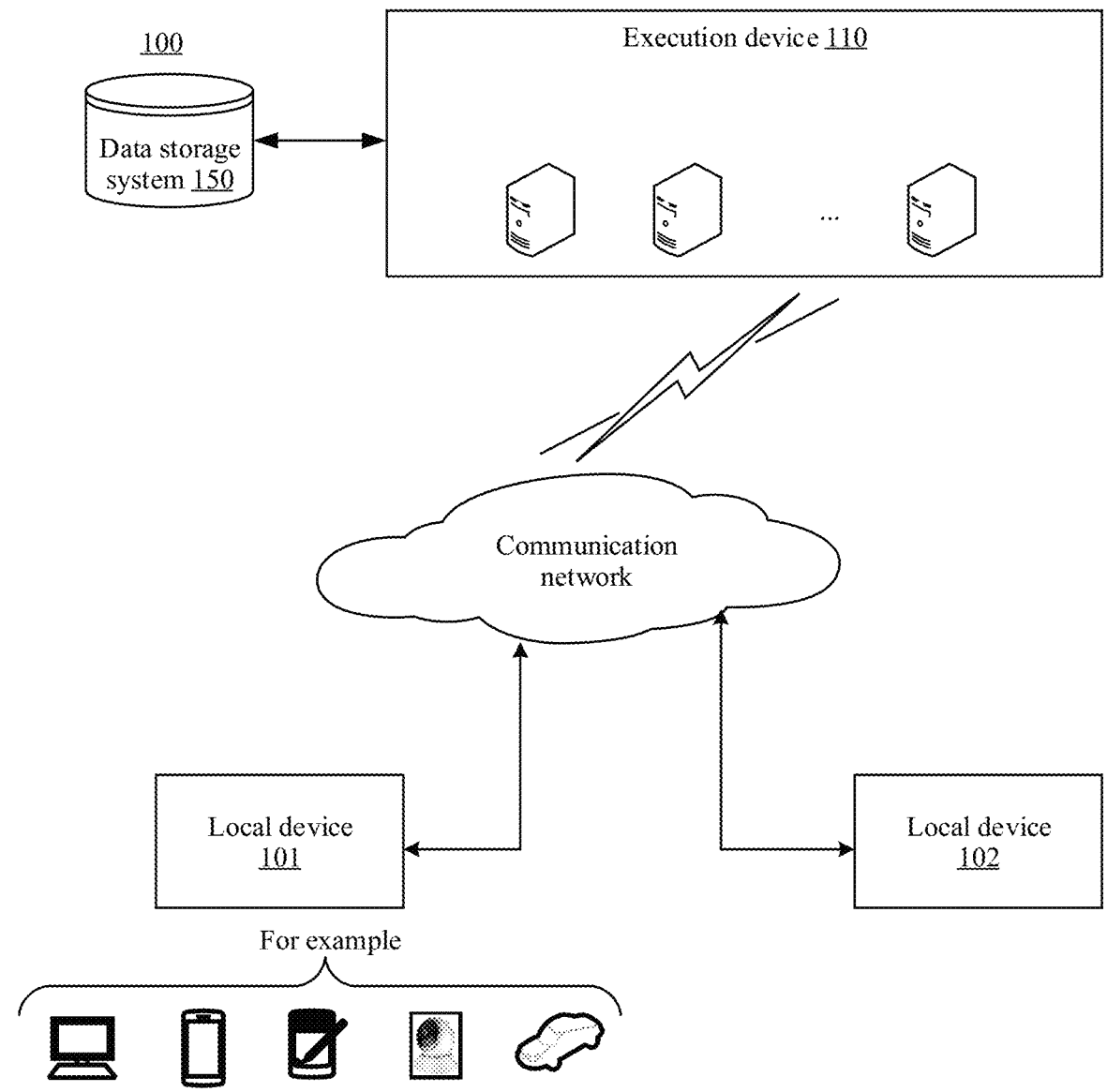
FIG. 1C shows another natural language processing system according to an embodiment of the present disclosure.

As shown in FIG. 1C, the user equipment may be a local device 101 or 102, and the data processing device may be an execution device 110. A data storage system 150 may be integrated into the execution device 110, or may be disposed in a cloud or another network server.

Figure 2:
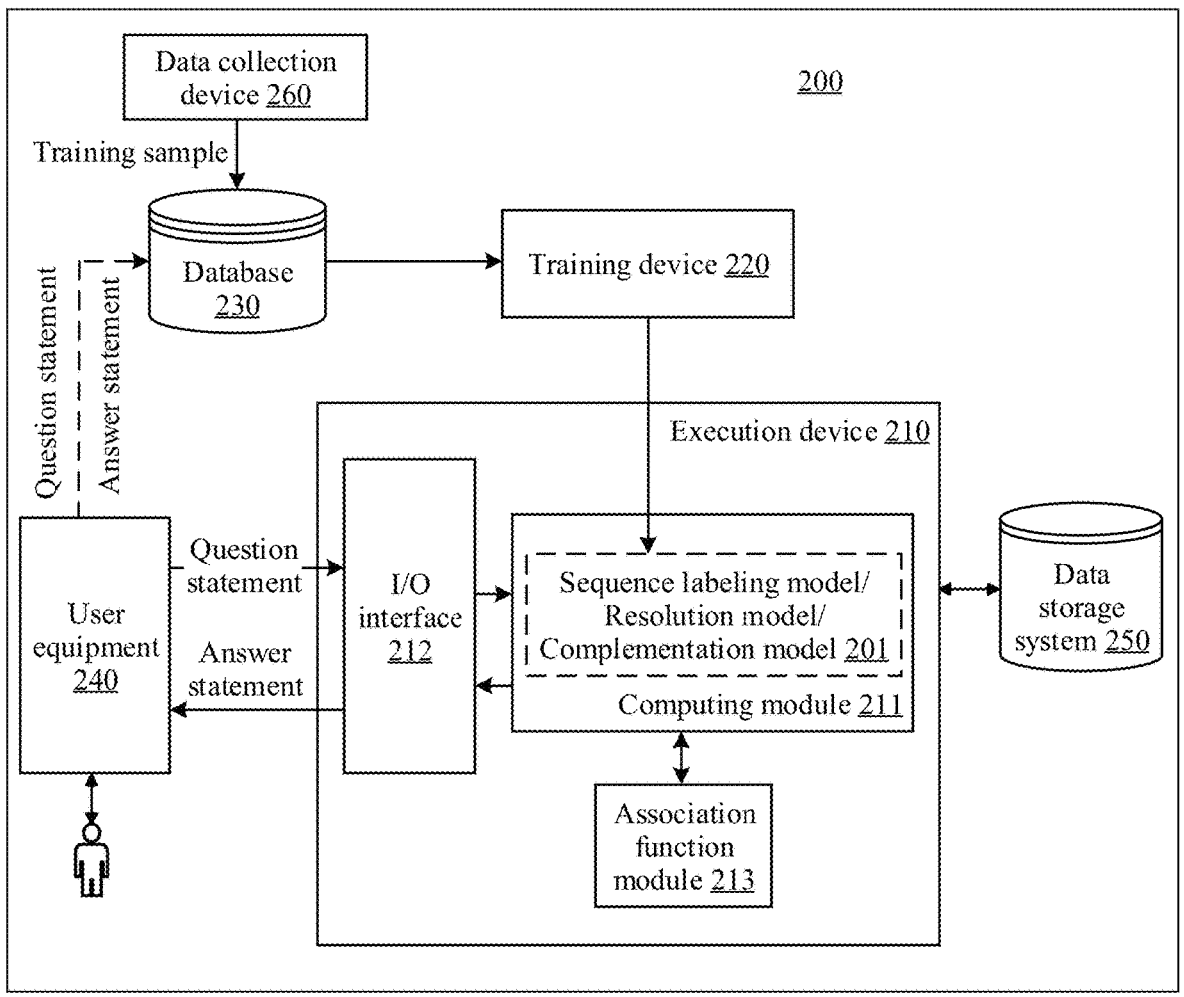
FIG. 2 shows a system architecture according to an embodiment of the present disclosure.

Refer to FIG. 2. An embodiment of the present disclosure provides a system architecture 200. A data collection device 260 is configured to collect training data and store the training data in a database 230. A training device 220 generates a sequence labeling model/resolution model/complementation model 201 based on the training data maintained in the database 230. The following describes in more detail how the training device 220 obtains the sequence labeling model/resolution model/complementation model 201 based on the training data. The generated sequence labeling model can determine location information that is in a question statement and on which coreference resolution needs to be performed, and determine location information that is in the question statement and in which semantics are missed. The generated resolution model can resolve the question statement based on the location information of the coreference resolution when the coreference resolution is performed, to obtain a resolved question statement. The generated complementation model can complement the missing semantics of the question statement, to obtain a complemented question statement.

FIG. 2 is a diagram of functional modules in a data processing process. Corresponding to actual application scenario diagrams in FIG. TA, FIG. 1B, and FIG. 1C, the user equipment 240 may be the intelligent terminal in FIG. TA and FIG. 1B. When a data processing capability of the intelligent terminal in FIG. 1B is relatively strong, the execution device 210 and a data storage system 250 may be integrated into the intelligent terminal. In some embodiments, the execution device 210 and the data storage system 250 may also be integrated into the data processing device in FIG. TA. The database 230, the training device 220, and the data collection device 260 may be correspondingly integrated into the data processing device in FIG. TA, and may be disposed in a cloud or in another network server.

In an NLP field, the data collection device 260 may be a terminal device, or may be an input/output interface of a server or cloud. The data collection device 260 is configured to: obtain a query statement, and return an interaction layer (interface) of a reply statement.

Work of each layer in a deep neural network may be described by using a mathematical expression: $\vec{y}=a(W\vec{x}+b)$ The work of each layer in the deep neural network may physically be understood as completing transformation from input space to output space (to be specific, row space to column space of a matrix) by performing five operations on the input space (a set of input vectors). The five operations include: 1: dimension raising/dimension reduction; 2: scaling out/scaling in; 3: rotation; 4: translation; and 5: "bending". The operations 1, 2, and 3 are completed by $W\vec{x}$, the operation 4 is completed by +b, and the operation 5 is implemented by $a(\ )$. A reason why the word "space" is used herein for description is that a classified object is not a single object, but a type of objects. The space refers to a set of all individuals of this type of objects. W is a weight vector, and each value in the vector represents a weight value of one neuron at this layer of a neural network. The vector W determines space transformation from the input space to the output space described above, to be specific, a weight W of each layer controls how to transform space. The deep neural network is trained to finally obtain a weight matrix (a weight matrix including vectors W of a plurality of layers) of all layers of the trained neural network. Therefore, a process of training the neural network is essentially a manner of learning control of spatial transformation, and more specifically, learning the weight matrix.

It is desired that an output of the deep neural network be close, as much as possible, to a predicted value that is actually expected. Therefore, a predicted value of a current network and an actually expected target value may be compared, and then a weight vector of each layer of the neural network is updated based on a difference between the two values (certainly, there is usually an initialization process before the first update, to be specific, parameters are preconfigured for all layers of the deep neural network). For example, if the predicted value of the network is excessively large, the weight vector is adjusted to make the predicted value smaller. Such adjustment is continuously performed until the neural network can obtain the actually expected target value through prediction. Therefore, "how to obtain, through comparison, the difference between the predicted value and the target value" needs to be predefined. This is a loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

The sequence labeling model/resolution model/complementation model 201 obtained by the training device 220 may be applied to different systems or devices. In FIG. 2, an I/O interface 212 is configured for the execution device 210, to exchange data with an external device. The "user" may input data into the I/O interface 212 by using a client device 240.

The execution device 210 may invoke data, code, and the like in the data storage system 250, or may store data, instructions, and the like in the data storage system 250.

An association functional module 213 performs preprocessing on the received question statement, to facilitate subsequent resolution and ellipsis complementation processing on the question statement.

Finally, the I/O interface 212 returns a processing result to the client device 240, and provides the processing result to the user.

More deeply, the training device 220 may generate a corresponding sequence labeling model/resolution model/complementation model 201 for different objectives based on different data, to provide a better result for the user.

In a case shown in FIG. 2, the user may manually specify data to be input into the execution device 210, for example, may operate in an interface provided by the I/O interface 212. In another case, the client device 240 may automatically input data into the I/O interface 212 and obtain a result. If the client device 240 needs to obtain authorization of the user for automatically inputting the data, the user may set corresponding permission on the client device 240. The user may view, on the client device 240, a result output by the execution device 210. A specific presentation form may be a specific manner, for example, display, a voice, or an action. The client device 240 may also be used as a data collection end to store the collected training data in the database 230.

It should be noted that, FIG. 2 is merely a schematic diagram of a system architecture according to an embodiment of the present disclosure. A position relationship between devices, components, modules, and the like shown in the figure does not constitute any limitation. For example, in FIG. 2, the data storage system 250 is an external storage device relative to the execution device 210, and in another case, the data storage system 250 may alternatively be disposed in the execution device 210.

Scenario Example 2: Training Based on a Convolutional Neural Network

The convolutional neural network (CNN) is a deep neural network with a convolutional structure, and is a deep learning architecture. In the deep learning architecture, multilayer learning is performed at different abstract levels according to a machine learning algorithm. As the deep learning architecture, the CNN is a feed-forward artificial neural network. Neurons in the feed-forward artificial neural network respond to a statement input into the neurons.

It should be noted that the sequence labeling model is obtained through training based on the CNN and an RNN, and the resolution model and the complementation model are obtained through training based on the CNN.

Figure 3:
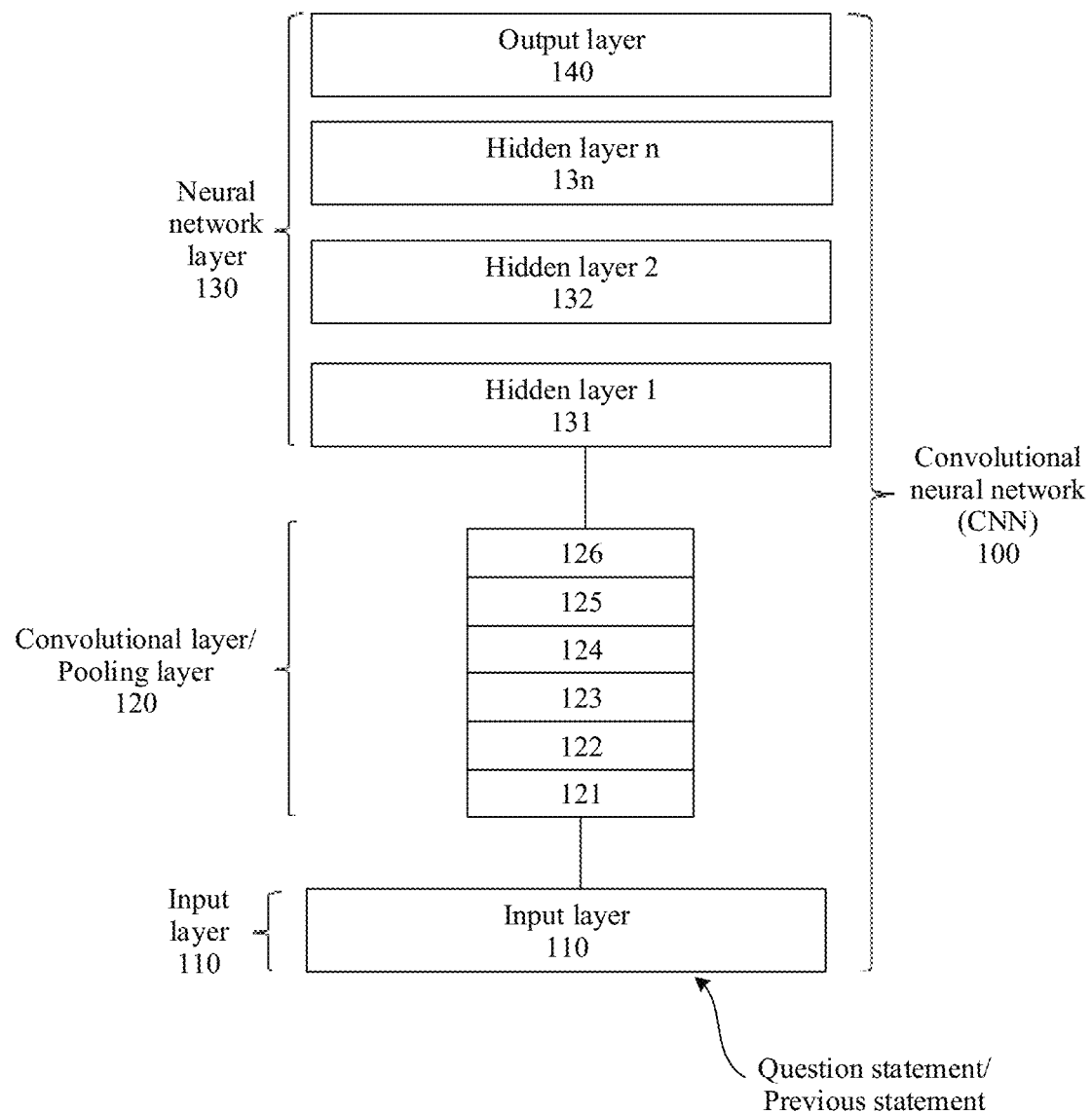
FIG. 3 is a schematic diagram of another convolutional neural network according to an embodiment of the present disclosure.

As shown in FIG. 3, a convolutional neural network (CNN) 100 may include an input layer 110, a convolutional layer/pooling layer 120, and a neural network layer 130. The pooling layer is optional.

Convolutional Layer/Pooling Layer 120:

Convolutional Layer:

As shown in FIG. 3, for example, the convolutional layer/pooling layer 120 may include layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layer 121 and the layer 122 are convolutional layers, the layer 123 is a pooling layer, the layer 124 and the layer 125 are convolutional layers, and the layer 126 is a pooling layer. To be specific, an output of a convolutional layer may be used as an input of a subsequent pooling layer, or may be used as an input of another convolutional layer to continue to perform a convolution operation.

The convolutional layer 121 is used as an example. The convolutional layer 121 may include a plurality of convolution operators. The convolution operator is also referred to as a kernel. In natural language processing, the convolution operator functions as a filter that extracts specific information from input voice or semantic information. The convolution operator may be a weight matrix essentially, and the weight matrix is usually predefined.

Weight values in weight matrices need to be obtained through massive training in actual application. Each weight matrix formed by using the weight values obtained through training may be used to extract information from an input image, to enable the convolutional neural network 100 to perform correct prediction.

When the convolutional neural network 100 has a plurality of convolutional layers, a relatively large quantity of general features are usually extracted at an initial convolutional layer (for example, the layer 121). The general feature may also be referred to as a low-level feature. As a depth of the convolutional neural network 100 increases, a feature extracted at a subsequent convolutional layer (for example, the layer 126) is more complex, for example, a high-level semantic feature. A feature with higher semantics is more applicable to a to-be-resolved problem.

Pooling Layer:

Because a quantity of training parameters usually needs to be reduced, a pooling layer usually needs to be periodically introduced after a convolutional layer. To be specific, for the layers 121 to 126 in 120 shown in FIG. 3, one convolutional layer may be followed by one pooling layer, or a plurality of convolutional layers may be followed by one or more pooling layers. During natural language data processing, the pooling layer is only used to reduce a space size of data.

Neural Network Layer 130:

After processing is performed at the convolutional layer/pooling layer 120, the convolutional neural network 100 still cannot output required output information. As described above, at the convolutional layer/pooling layer 120, only a feature is extracted, and a parameter resulting from input data is reduced. However, to generate final output information (required class information or other related information), the convolutional neural network 100 needs to use the neural network layer 130 to generate an output of one required class or outputs of a group of required classes. Therefore, the neural network layer 130 may include a plurality of hidden layers (131, 132, ..., and 13n shown in FIG. 3) and an output layer 140. Parameters included in the plurality of hidden layers may be obtained through pre-training based on related training data of a specific task type. For example, the task type may include voice or semantics recognition, classification, generation, or the like.

The plurality of hidden layers included by the neural network layer 130 are followed by the output layer 140, namely, the last layer of the entire convolutional neural network 100. The output layer 140 has a loss function similar to a categorical cross entropy, and the loss function is specifically configured to calculate a prediction error. Once forward propagation (for example, propagation from 110 to 140 in FIG. 3 is forward propagation) of the entire convolutional neural network 100 is completed, reverse propagation (for example, propagation from 140 to 110 in FIG. 3 is reverse propagation) is started to update a weight value and a deviation of each layer mentioned above, to reduce a loss of the convolutional neural network 100 and an error between a result output by the convolutional neural network 100 by using the output layer and an ideal result.

It should be noted that the convolutional neural network 100 shown in FIG. 3 is merely used as an example of a convolutional neural network. During specific application, the convolutional neural network may alternatively exist in a form of another network model, for example, a plurality of parallel convolutional layers/pooling layers shown in FIG. 4, and extracted features are all input into the entire neural network layer 130 for processing.

After receiving the question statement, the execution device 210 determines, by using the sequence labeling model, the location information that is in the question statement and on which coreference resolution needs to be performed. Then, the resolution model performs coreference resolution on the question statement based on a previous statement of the question statement and the location information of the coreference resolution. Accuracy of the coreference resolution can be improved by introducing the sequence labeling model and the resolution model. This improves a missing semantics complementation effect. After receiving the question statement, the execution device 210 determines, by using the sequence labeling model, a location at which a general component is missing in the question statement, and then complements the missing component by using the complementation model and a previous statement. Accuracy of the coreference resolution can be improved by introducing the sequence labeling model, the resolution model, and the complementation model. This improves a missing semantics complementation effect.

It is assumed that a previous statement of a question statement "How tall is he?" is "Yao Ming is a basketball player". Therefore, candidate antecedents of the previous statement include: "Yao Ming", "basketball", and "player". A complementing apparatus scores the candidate antecedents by using the resolution model, and obtains scoring results of the candidate antecedents: Yao Ming: 3.6, basketball: 0.6, player: 2.7, and a blank word: 1.5. In this case, a first threshold is the score 1.5 of the blank word. The candidate antecedents whose scores are higher than the first threshold include "Yao Ming" and "player". The complementing apparatus selects the candidate antecedent with the highest score from "Yao Ming" and "player", to resolve a to-be-resolved item "he", and a question statement obtained after the resolution is: "How tall is Yao Ming?".

Figure 4:
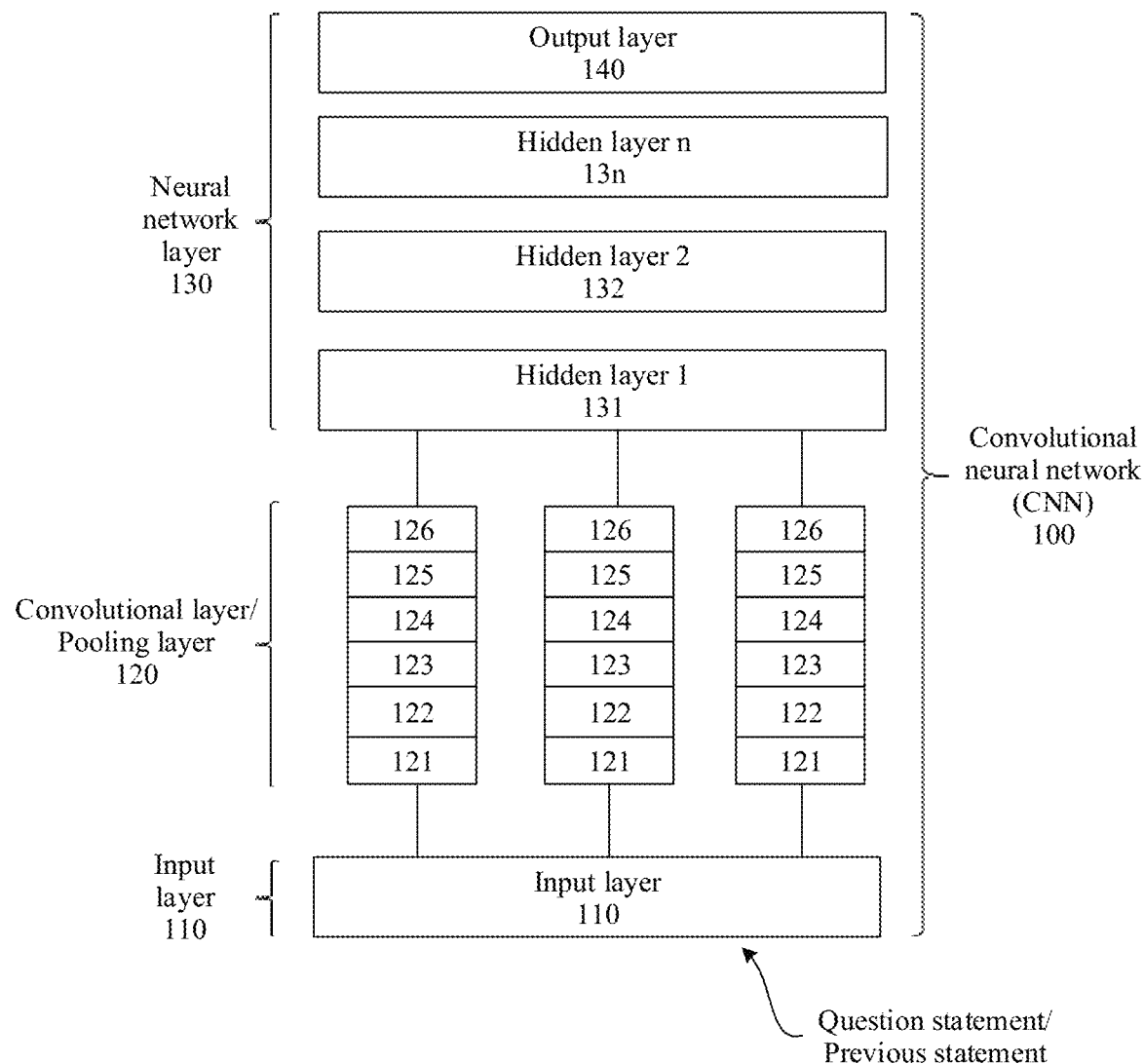
FIG. 4 is a schematic diagram of another convolutional neural network according to an embodiment of the present disclosure.

In the scenarios shown in FIG. 1A and FIG. 1B, a processor of the intelligent terminal runs the convolutional neural networks shown in FIG. 3 and FIG. 4. In the scenario shown in FIG. 1C, the execution device 110 runs the convolutional neural networks shown in FIG. 3 and FIG. 4. In the system shown in FIG. 2, the training device 220 and a computing module 211 in the execution device 210 run the convolutional neural networks shown in FIG. 3 and FIG. 4.

Figure 5:
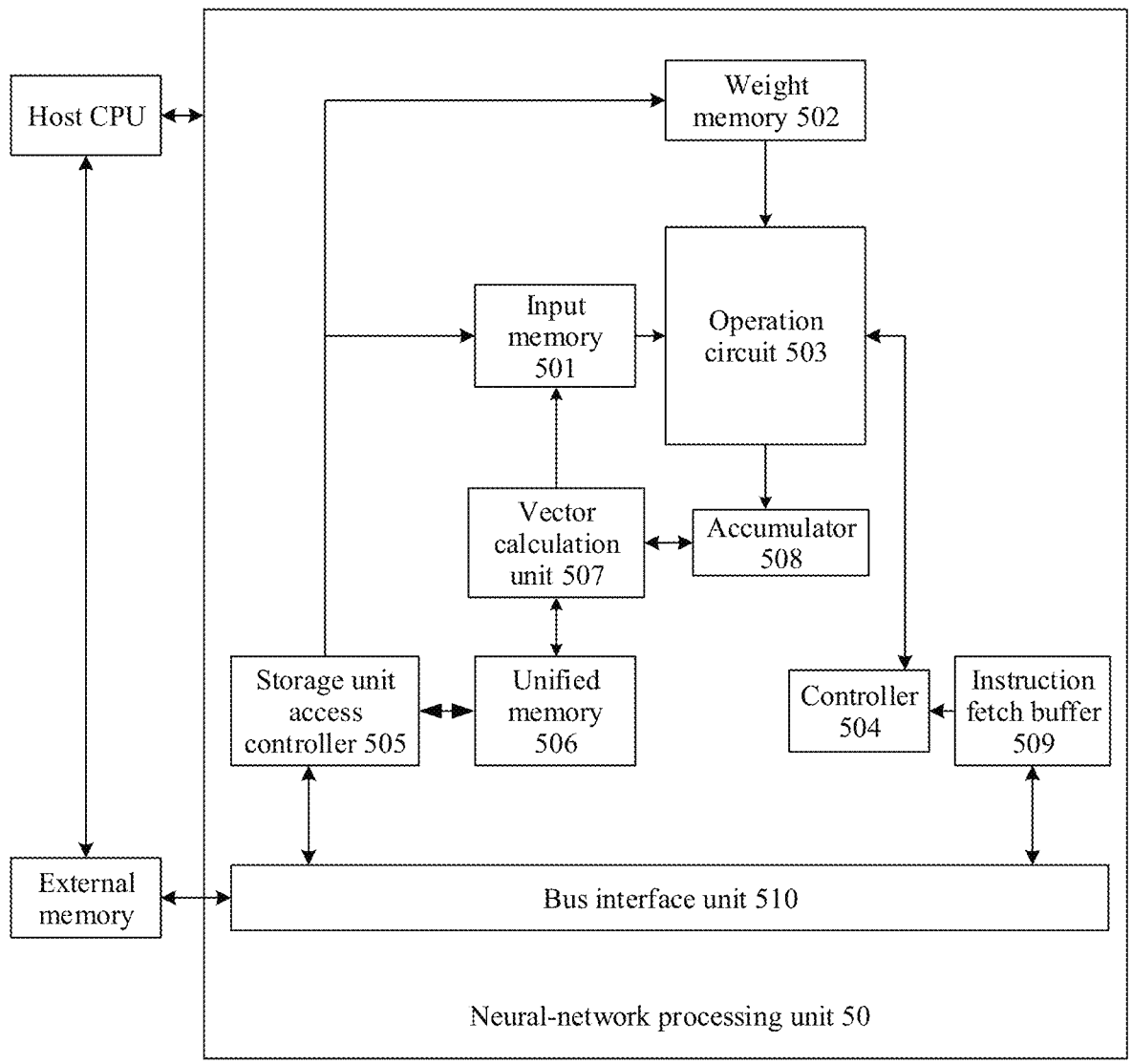
FIG. 5 is a structural diagram of hardware of a chip according to an embodiment of the present disclosure.

FIG. 5 is a structural diagram of hardware of a chip according to an embodiment of the present disclosure. The convolutional neural network-based algorithms shown in FIG. 3 and FIG. 4 may be implemented in an NPU chip shown in FIG. 5.

A neural-network processing unit NPU 50, as a coprocessor, is mounted to a host CPU, and the host CPU assigns a task. A core part of the NPU is an operation circuit 50, and a controller 504 controls the operation circuit 503 to extract data in a memory (a weight memory or an input memory) and perform an operation.

In some implementations, the operation circuit 503 includes a plurality of process engines (PE) inside. In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit fetches, from a weight memory 502, data corresponding to the matrix B, and buffers the data on each PE in the operation circuit. The operation circuit fetches data of the matrix A from an input memory 501, to perform a matrix operation on the matrix B, and a partial result or a final result of an obtained matrix is stored in an accumulator 508.

A vector calculation unit 507 may perform further processing such as vector multiplication, vector addition, an exponent operation, a logarithm operation, or value comparison on an output of the operation circuit. For example, the vector calculation unit 507 may be configured to perform network calculation, such as pooling, batch normalization, or local response normalization, at a non-convolutional/non-FC layer in a neural network.

In some implementations, the vector calculation unit 507 can store a processed output vector in a unified cache 506. For example, the vector calculation unit 507 can apply a non-linear function to an output of the operation circuit 503, for example, a vector of an accumulated value, used to generate an activated value. In some implementations, the vector calculation unit 507 generates a normalized value, a combined value, or both. In some implementations, the processed output vector can be used as an activated input to the operation circuit 503, for example, the processed output vector can be used at a subsequent layer of the neural network.

In this application, that a neural network model of a CNN and a neural network model of an RNN are trained to obtain a sequence labeling model, that a CNN model is trained to obtain a resolution model and a complementation model, and an algorithm for complementing a question statement by using the sequence labeling model, the resolution model, and the complementation model to obtain a target complemented question statement may be executed by the vector calculation unit 507 and the operation circuit 503.

The unified memory 506 is configured to store input data and output data.

A storage unit access controller 505 (Direct Memory Access Controller, DMAC) is configured to transfer input data in an external memory to the input memory 501 and/or the unified memory 506, stores weight data in the external memory in the weight memory 502, and stores data in the unified memory 506 in the external memory.

A bus interface unit (BIU) 510 is configured to implement interaction among the host CPU, the DMAC, and an instruction fetch buffer 509 through a bus.

The instruction fetch buffer 509 connected to the controller 504 is configured to store instructions used by the controller 504.

The controller 504 is configured to invoke the instruction buffered in the instruction fetch buffer 509, to control a working process of an operation accelerator.

The external memory stores data, for example, a training dataset that is obtained by the host CPU and that is used to train the CNN, an RNN model, and the CNN model.

Usually, the unified memory 506, the input memory 501, the weight memory 502, and the instruction fetch buffer 509 each are an on-chip memory. The external memory is a memory outside the NPU. The external memory may be a double data rate synchronous dynamic random access memory (DDR SDRAM), a high bandwidth memory (HBM), or another readable and writable memory.

The host CPU and the NPU in the chip shown in FIG. 5 cooperate to complete a program algorithm used to complement a question statement in FIG. 1A, FIG. 1B, FIG. 1C, and FIG. 2. Specifically, before location information of a to-be-resolved item in the question statement is obtained, the host CPU obtains a first training dataset. The NPU trains the CNN- and RNN-based neural network model by using the first training dataset, to obtain a first sequence labeling model. Then, the host CPU inputs the question statement into the NPU, and the NPU determines the location information of the to-be-resolved item in the question statement by using the first sequence labeling model. Before the to-be-resolved item in the question statement is resolved, the host CPU obtains a second training dataset. The NPU trains a CNN-based model by using the second training dataset, to obtain the resolution model. Then, the host CPU inputs the question statement into the NPU. The NPU resolves a to-be-resolved item in the question statement based on the resolution model and location information of the to-be-resolved item, to obtain a resolved question statement. The NPU transmits the resolved question statement to the host CPU.

Before determining whether a general component in the question statement is ellipted, the host CPU obtains a training dataset. The NPU trains the CNN- and RNN-based neural network model by using the training dataset, to obtain a second sequence labeling model. Then, the host CPU inputs the question statement into the NPU, and the NPU determines location information of the ellipted general component in the question statement by using the second sequence labeling model. The host CPU obtains a third training dataset, and the NPU trains a CNN-based model by using the third training dataset, to obtain the complementation model. Then, the host CPU inputs the question statement into the NPU. The NPU complements the ellipted general component by using the complementation model and the location information of the ellipted general component, to obtain a question statement after ellipsis resolution.

It should be noted herein that the chip shown in FIG. 5 may further perform an RNN-related operation.

Figure 6:
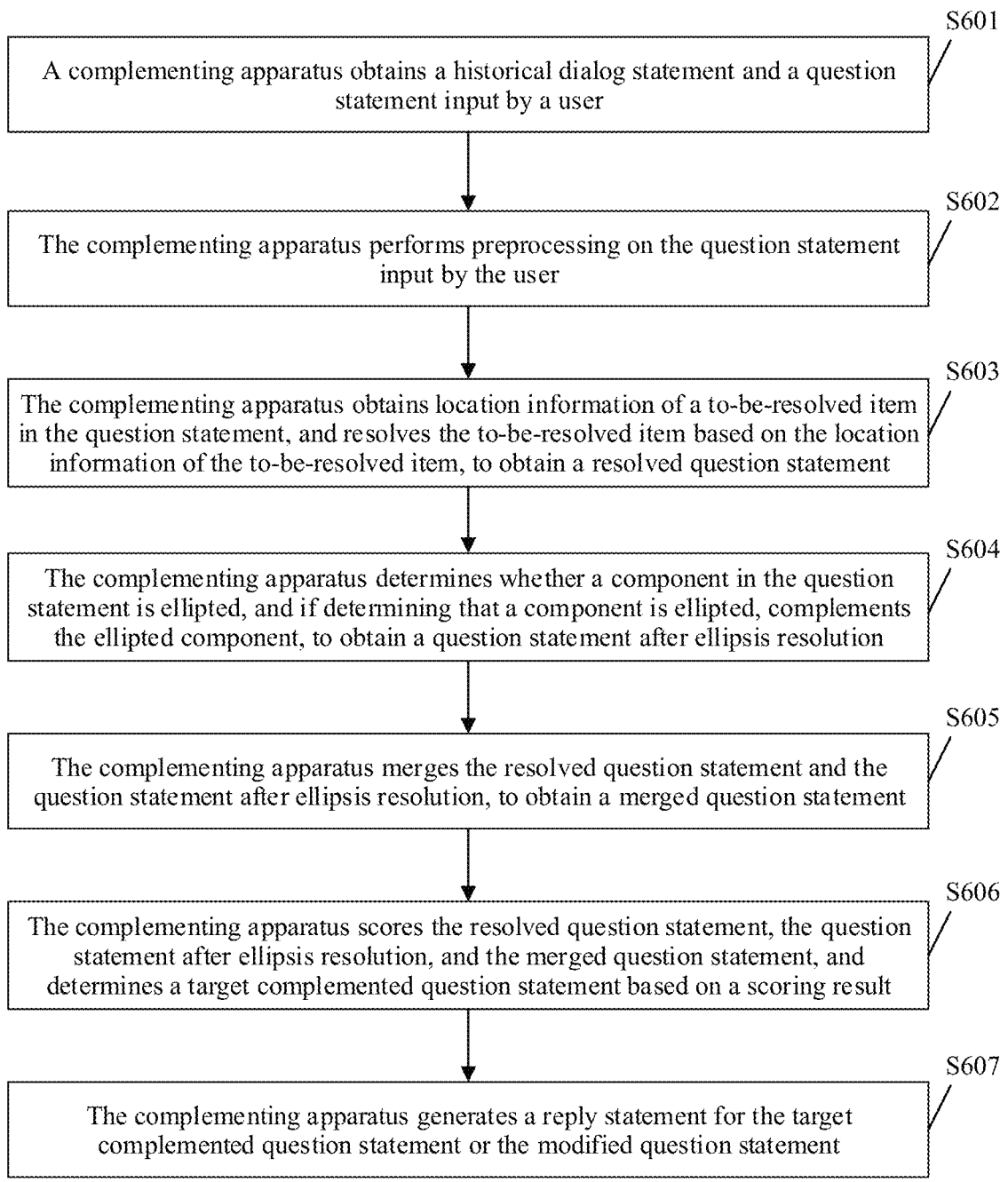
FIG. 6 is a schematic flowchart of a missing semantics complementing method according to an embodiment of the present disclosure.

FIG. 6 is a schematic flowchart of a missing semantics complementing method according to an embodiment of the present disclosure. As shown in FIG. 6, the method includes the following steps.

S601: A complementing apparatus obtains a historical dialog statement and a question statement input by a user.

The complementing apparatus obtains the question statement input by the user by using a keyboard; or receives voice information input by the user through voice, and converts the voice information into text information, to further obtain the question statement input by the user.

S602: The complementing apparatus performs preprocessing on the question statement input by the user.

Preprocessing performed on the question statement input by the user includes but is not limited to word segmentation, part-of-speech tagging, sentence problem type identification, and stem sentence extraction.

In a possible embodiment, preprocessing performed on the question statement input by the user includes some or all of word segmentation, part-of-speech tagging, sentence problem type identification, and stem sentence extraction.

Specifically, word segmentation performed on the question statement is to divide the question statement into separate words, and part-of-speech tagging is tagging a part of speech of a word obtained after word segmentation is performed on the question statement. The part of speech includes nouns, verbs, adjectives, pronouns, numerals, quantifiers, auxiliary words, prepositions, conjunctions, and the like. For example, the question statement is "What phone did Xiao Ming buy?". A word segmentation result of the question statement is "Xiao Ming buy did what phone?", and a part-of-speech tagging result of the word segmentation is "nr v u r n w". nr is used to indicate that "Xiao ming" is a person name, v is used to indicate that "buy" is a verb, u is used to indicate that "did" is an auxiliary word, r is used to indicate that "what" is a pronoun (or an interrogative pronoun), n is used to indicate that "phone" is a noun, and w is used to indicate that "?" is punctuation.

It should be noted that an identifier used to indicate the part of speech of the word may alternatively be represented in another form, for example, a number 1, 2, 3, 4, or the like. This is not limited in this application.

A type of the question statement includes but is not limited to a type such as WHAT/WHERE/WHEN/WHO/WHY/HOW/YES_NO/STATEMENT. WHAT represents an interrogative sentence about an object, WHERE represents an interrogative sentence about a place, WHEN represents an interrogative sentence about a time, WHO represents an interrogative sentence about a person, WHY represents an interrogative sentence about a reason, HOW represents an inquiry statement, YES_NO represents a true or false interrogative sentence, and STATEMENT represents a declarative sentence. For example, a type of "what phone did Xiao Ming buy?" is the WHAT type, and a type of "how do I make egg fried rice?" is the HOW type.

That a questioning apparatus determines a type of a question statement specifically includes: The questioning apparatus first determines whether the question statement is an interrogative sentence or a declarative sentence; and if determining that the question statement is the interrogative sentence, the questioning apparatus continues to determine which one of the WHAT type, the WHERE type, the WHEN type, the WHO type, the WHY type, and the HOW type is the question statement.

The stem sentence extraction is to extract a main sentence component in a statement, including a subject, a verb, and an object. In an example, syntax analysis is performed on a question statement, and a subject, a verb, and an object of the question statement are extracted based on an analysis result. In another example, a training dataset is constructed, neural network training is performed, to obtain a sequence labeler. Then, start locations of a subject, a verb, and an object in an extracted statement are predicted by using the sequence labeler.

For example, a stem of the question statement "What phone did Xiao Ming buy?" is "Xiao Ming" (namely, the subject), "buy" (namely, the verb), and "phone" (namely, the object).

It should be noted that, word segmentation and part-of-speech tagging may be performed on the question statement entered by the user by using tools such as a language technology platform (LTP) of the Harbin Institute of Technology, natural language processing and information retrieval (NLPIR) of the Institute of Computer Technology, Chinese Academy of Sciences, a Tsinghua University lexical analyzer for Chinese (THULAC), jieba, and Stanford CoreNLP. A tool such as the Stanford CoreNLP, or another manner can be used for the syntax analysis performed on the question statement.

S603: The complementing apparatus obtains location information of a to-be-resolved item in the question statement, and resolves the to-be-resolved item based on the location information of the to-be-resolved item, to obtain a resolved question statement.

In a possible embodiment, the complementing apparatus determines the location information of the to-be-resolved item in the question statement by using a sequence labeling model.

Specifically, the complementing apparatus obtains a word number sequence and a part-of-speech number sequence of the question statement. The word number sequence includes a number corresponding to each word in the question statement, and the part-of-speech number sequence includes a number corresponding to a part of speech of each word in the question statement. The word number sequence and the part-of-speech number sequence of the question statement are input into a first sequence labeling model for calculation, to obtain the location information of the to-be-resolved item. The to-be-resolved item in the question statement is determined based on the location information of the to-be-resolved item. For example, location information of a to-be-resolved item in a question statement "How tall is he?" is "1 0 0 0". The complementing apparatus may determine that the to-be-resolved item exists at the $0^{th}$ location (namely, "he") in the reminder statement.

It should be noted that, after performing word segmentation on the question statement, the questioning apparatus obtains a word number and a part-of-speech number of each word in the question statement by querying the word number and the part-of-speech number in a word list/dictionary, and further obtains the word number sequence and the part-of-speech number sequence of the question statement.

The complementing apparatus obtains a candidate antecedent of a previous statement of the question statement. Optionally, the complementing apparatus may obtain one or more candidate antecedents in the previous statements by using a named entity recognizer (NER) tool. The complementing apparatus scores each of the one or more candidate antecedents by using a resolution model, to obtain a score of each candidate antecedent; and select candidate antecedents whose scores are higher than a first threshold, to resolve the to-be-resolved item.

If there are a plurality of candidate antecedents whose scores are higher than the first threshold, the complementing apparatus uses a candidate antecedent with a highest score to resolve the to-be-resolved item, and stores, in a candidate table, a candidate antecedent, other than the candidate antecedent with the highest score, that is in the candidate antecedents whose scores are higher than the first threshold and whose absolute value of a difference between a score and the highest score is less than a fourth threshold.

It should be noted herein that, for the complementing apparatus, the previous statement is a statement that is received before the question statement and that has a shortest interval between a receiving time of the previous statement and a receiving time of the question statement. In contrast, the question statement may be referred to as a current statement.

It is assumed that a previous statement of a question statement "How tall is he?" is "Yao Ming is a basketball player". Therefore, candidate antecedents of the previous statement include: "Yao Ming", "basketball", and "player". A complementing apparatus scores the candidate antecedents by using the resolution model, and obtained scoring results of the candidate antecedents are: Yao Ming: 3.6, basketball: 0.6, player: 2.7, and a blank word: 1.5. In this case, a first threshold is the score 1.5 of the blank word. The candidate antecedents whose scores are higher than the first threshold include "Yao Ming" and "player". The complementing apparatus selects the candidate antecedent with the highest score from "Yao Ming" and "player", to resolve a to-be-resolved item "he", and a question statement obtained after the resolution is: "How tall is Yao Ming?".

Further, if the fourth threshold is 1, because an absolute value of a difference between the score of the candidate antecedent "player" and the highest score is 0.9, which is less than the fourth threshold, the complementing apparatus stores the candidate antecedent "player" in the candidate table.

The first sequence labeling model is obtained through convolutional neural network- (CNN) and recurrent neural network- (RNN) based training, and the resolution model is obtained through CNN-based training.

It should be noted that a combination of a CNN and an RNN is used to extract more semantic information.

In a possible embodiment, the complementing apparatus obtains a first training dataset, and then trains a CNN- and RNN-based neural network model based on the first training dataset, to obtain the first sequence labeling model. A purpose of obtaining the first sequence labeling model through the CNN- and RNN-based combination training is to extract more semantic information.

The first training dataset includes a plurality of first statement pairs, and each first statement pair includes an original statement and a modified statement. A source of the original statement may be community question and answer data or historical question and answer data of a question and answer system.

After obtaining the original statement, the complementing apparatus performs named entity recognition on the original statement by using the NER tool such as the Stanford CoreNLP tool, to recognize a person name, a place name, a time, a noun phrase, and the like in the original statement. For example, named entity recognition is performed on an original statement "How tall is Yao Ming?", to recognize an entity "Yao Ming" of a person name type included in the original statement. The corresponding named entity (for example, "Yao Ming") in the original statement is replaced with a pronoun (that is, "Yao Ming" is replaced with a pronoun "he"), to obtain a modified statement corresponding to the original statement, and label a location of the pronoun in the modified statement. For example, the location of the pronoun in the modified statement "How tall is he?" is labeled as "1 0 0 0 0" or "0 1 1 1 1".

The first sequence labeling model includes an input layer, an embedding layer, a convolutional layer, a pooling layer, a merge layer, an encoding/decoding layer, and a fully connected layer.

Input data of the input layer is a vector including a number corresponding to each word in the original statement and a vector including a number corresponding to a part of speech of each word in the original statement. The number corresponding to the word is from a word table and the number corresponding to the part of speech of the word is from a part-of-speech table. Each word and the part of speech of the word correspond to a number respectively. The word table is a correspondence table between a word and a number, and the part-of-speech table is a correspondence table between a part of speech and a number. In other words, the input data of the input layer is two vectors.

Embedding layer: Use each word and a part of speech of the word in the original statement to be corresponding to a vector of a fixed quantity of dimensions (for example, 200 dimensions), as a continuous mathematical representation of the word and the part of speech of the word, and combine vectors to form an embedded matrix of the original statement.

Convolutional layer: Perform convolution operations for a given quantity of times on an embedding matrix of a sentence and a part of speech by using different quantities of CNN convolution kernels.

Pooling layer: Merge largest values in different convolution results that are obtained after convolutional layer processing is performed on an embedding representation of a word and a part of speech, to obtain a word meaning vector and a part-of-speech number sequence of the sentence.

Merge layer: Merge the word meaning vector and the part-of-speech number sequence of the sentence, to obtain a unified CNN sentence vector.

Sequence encoding: Use the obtained sentence vector as an initial state of an encoding layer, and use an RNN neural network (for example, a long short-term memory (LSTM) network) to encode the sentence, to obtain a sequence of the sentence.

Sequence decoding: Use the obtained sequence of the sentence as an input of a decoding layer, and use the RNN neural network (for example, the LSTM) to perform decoding output on each word of the sentence, to obtain a vector of each word.

Fully connected layer: Connect the vector of each word obtained after decoding to a fully connected neural network classifier, and label whether the word belongs to an anaphor.

In a possible embodiment, the complementing apparatus obtains a second training dataset, and then trains a CNN model based on the second training dataset, to obtain the resolution model. The second training dataset includes a plurality of second statement pairs, and each second statement pair includes a candidate antecedent and a score of the candidate antecedent.

The resolution model includes an input layer, an embedding layer, a convolutional layer, a pooling layer, a merge layer, an encoding/decoding layer, and a fully connected layer.

Input layer: Input data of the input layer is a vector including a number corresponding to each word in the previous statement of the question statement and a vector including a number corresponding to a part of speech of each word in the question statement. The number corresponding to the word is from a word table and the number corresponding to the part of speech of the word is from a part-of-speech table. Each word and the part of speech of the word correspond to a number respectively. The word table is a correspondence table between a word and a number, and the part-of-speech table is a correspondence table between a part of speech and a number. In other words, the input data of the input layer is two vectors.

Embedding layer: Use a vector of a fixed quantity of dimensions (for example, 200 dimensions) corresponding to each word and a part of speech of the word in the previous statement of the question statement, as a continuous mathematical representation of the word and the part of speech of the word, and combine vectors to form an embedding matrix of the previous statement.

Convolutional layer: Perform convolution operations for a given quantity of times on an embedding matrix of a sentence and a part of speech by using different quantities of CNN convolution kernels.

Pooling layer: Merge largest values in different convolution results that are obtained after convolutional layer processing is performed on an embedding representation of a word and a part of speech, to obtain a word meaning vector and a part-of-speech number sequence of the sentence. The convolutional layer and the pooling layer together form a sequence-CNN-pooling module.

Merge layer: Merge the word meaning vector, the part-of-speech number sequence, and a vector of a candidate word that are of the sentence, to obtain a unified CNN vector.

Fully connected layer: Input the obtained CNN vector to a fully connected neural network scorer, to obtain a score of the candidate antecedent.

During training, a positive case and a negative case can be constructed manually. A positive case score is high, and a negative case score is low. Training is performed by selecting a correct coreference object as the positive case and by selecting a wrong coreference object as the negative case.

S604: The complementing apparatus determines whether a component in the question statement is ellipted, and if determining that a component is ellipted, complements the ellipted component, to obtain a question statement after ellipsis resolution.

That the complementing apparatus determines whether a component in the question statement is ellipted includes one or more of the following cases.

Case 1: Determine whether a stem sentence component in the question statement is ellipted.

Case 2: Determine whether a notional word that is in the question statement and that is corresponding to an attribute word is ellipted.

Case 3: Determine whether a general component in the question statement is ellipted.

In an example, that the complementing apparatus determines whether the stem sentence component in the question statement is ellipted specifically includes: first determining whether a sentence pattern of the question statement and a sentence pattern of the previous statement meet a preset condition, or determining whether a body of the sentence pattern of the question statement is a proper subset of the previous statement.

The preset condition may be as follows:

The sentence pattern of the previous statement is an interrogative sentence, and the sentence pattern of the question statement is an interrogative sentence or the body of the question statement is a combination of "what about + noun phrase?". For example, the previous statement is "where is the provincial capital of Hebei?", and the question statement is "what about Shandong?" or "Shandong?".

Alternatively, the sentence pattern of the previous statement is a declarative sentence, and the sentence pattern of the question statement is an interrogative sentence or the body of the question statement is a combination of "what about + noun phrase?" or a combination of "noun phrase?". For example, the previous statement is "Hebei's provincial capital is Shijiazhuang", and the question statement is "what about Shandong?" or "Shandong?".

The determining whether a stem of the sentence pattern of the question statement is a proper subset of a body of the previous statement is specifically: extracting the stem of the previous statement and the stem of the question statement, and then determining whether a non-noun phrase part in the stem of the question statement is the proper subset of the stem of the previous statement. For example, a current statement is "do you eat mooncakes", and the previous statement is "do we eat zongzi (rice dumpling) on the Dragon Boat Festival". The stem of the question statement is "eat mooncakes", and the stem of the previous statement is "eat zongzi on the Dragon Boat Festival". After noun phrases are removed from the stem of the question statement and the stem of the previous statement, the stem of the question statement is "eat", which is the proper subset of the previous statement.

When the sentence pattern of the question statement and the sentence pattern of the previous statement meet the preset condition, or the body of the question statement is the proper subset of the previous statement, it is then determined whether there is a same-type relationship between a phrase in the question statement and a phrase in the previous statement. If there is the same-type relationship between the phrase in the question statement and the phrase in the previous statement, the complementing apparatus determines that the stem sentence component in the question statement is ellipted. For example, there is the same-type relationship between "zongzi" and "mooncakes" in the previous step.

It should be noted that, whether there is the same-type relationship between phrases may be determined by using a synonym dictionary such as a synonym word forest of Harbin Institute of Technology or HowNet of China National Knowledge Infrastructure. A similarity calculation algorithm may be further designed based on a word number sequence, to determine, according to the algorithm, whether there is the same-type relationship between the phrases, in other words, determine whether the phrases are same-type phrases.

After determining that the stem sentence component in the question statement is ellipted, the complementing apparatus complements the ellipted stem component in the question statement. Specifically, the complementing apparatus retains an overall structure of the previous statement, and then replaces same-type phrases. For example, the previous statement is "where is the provincial capital of Hebei?", and the question statement is "what about Shandong?". If "Hebei" in the previous statement is replaced with "Shandong", a complemented question statement is "where is the provincial capital of Shandong?".

In an example, that the complementing apparatus determines whether the notional word that is in the question statement and that is corresponding to the attribute word is ellipted specifically includes: removing a meaningless word from a sentence head of the question statement, to obtain a processed question statement; and determining whether a sentence head word in the processed question statement is the attribute word. If the sentence head word in the processed question statement is the attribute word, the complementing apparatus determines that the notional word that is in the question statement and that is corresponding to the attribute word is ellipted.

It should be noted that meaningless words at the sentence head may be some stop words or common questioning phrases such as "can you tell me", "can you look it up", and "can you help me with this".

For example, it is assumed that the question statement is "do you know how tall he is?". The complementing apparatus removes the meaningless words "do you know" from the sentence head of the question statement, and obtains the processed question statement "how tall he is?". The complementing apparatus determines that a sentence head word "tall" (In Chinese syntax, "tall" is usually the sentence head word of the question statement) of the processed question statement "how tall he is?" is an attribute word, and further determines that a notional word corresponding to the attribute word "tall" is ellipted.

The complementing apparatus may determine, based on an attribute-notional word pair, the notional word corresponding to the attribute word. The attribute-notional word pair can have a plurality of sources, including an encyclopedia entry/Wikipedia, a business domain knowledge graph, and manual addition. An infobox of the encyclopedia entry/Wikipedia includes numerous attribute-notional word pairs. For example, an entry of "Yao Ming" includes information such as "nationality", "height", "weight", and "birth place", and some high-frequency words are selected, as attribute words corresponding to the notional word "Yao Ming", manually or by the complementing apparatus from the information. Business domain knowledge graph data includes some attribute-notional word pairs, for example, stock-stock price, instrument-temperature, and the like, commonly used in a business domain. In addition, some attribute-notional word pairs, for example, movie-release time and movie-box office, that are not included in the encyclopedia entry, the Wikipedia, and the business domain knowledge graph can be manually added.

Further, the complementing apparatus complements the notional word corresponding to the ellipted attribute word in the question statement. Specifically, the complementing apparatus scores each candidate notional word in the one or more candidate notional words in the previous statement by using a complementation model, to obtain a score of each candidate notional word; selects a candidate notional word whose score is higher than a second threshold as a target notional word; and if there are a plurality of candidate notional words whose scores are higher than the second threshold, selects, as the target notional word, a candidate notional word with a highest score in the plurality of candidate notional words whose scores are higher than the second threshold. The complementing apparatus complements, based on the target notional word, the notional word corresponding to the attribute word in the question statement. In other words, the target notional word is the notional word corresponding to the attribute word in the question statement.

If there are a plurality of candidate nouns or noun phrases whose scores are higher than the second threshold, the complementing apparatus stores, in the candidate table, a candidate noun or noun phrase, other than a candidate noun or noun phrase with a highest score, that is in candidate antecedents whose scores are higher than the second threshold and whose absolute value of a difference between a score and the highest score is less than a fifth threshold.

It should be noted that a plurality of candidate notional words are nouns or noun phrases in the previous statement of the question statement.

For example, the question statement is "how tall is he?", and an attribute word in the question statement is "tall". A previous statement of the question statement is "Yao Ming is a basketball player", and candidate notional words include "Yao Ming", "basketball", and "player". The complementing apparatus scores the candidate notional words "Yao Ming", "basketball", and "player" respectively by using the complementation model, and scoring results are: Yao Ming: 3.6, basketball: 0.6, player: 2.7, and a blank word: 1.5. The complementing apparatus determines the scoring result of the blank word as the second threshold. Therefore, candidate notional words whose scoring results are higher than the second threshold include "Yao Ming" and "player". Because the scoring result of "Yao Ming" is higher than the scoring result of "player", the complementing apparatus determines the candidate notional word "Yao Ming" as the target notional word, and complements the notional word corresponding to the attribute word in the question statement based on the target notional word "Yao Ming". In other words, a complemented question statement is "how tall is Yao Ming?".

Further, if the fifth threshold is 1, because an absolute value of a difference between the score of the candidate noun "player" and the highest score is 0.9, which is less than the fifth threshold, the complementing apparatus stores the candidate noun "player" in the candidate table.

Before scoring the plurality of candidate notional words in the previous statement by using the complementation model, the complementing apparatus obtains a third training dataset, and then trains the CNN based on the third training dataset, to obtain the complementation model. For a specific process, refer to related descriptions in which the complementing apparatus trains the RNN and the CNN based on the first training dataset to obtain the resolution model. Details are not described herein again.

In an example, that the complementing apparatus determines whether the general component in the question statement is ellipted specifically includes: The complementing apparatus extracts a part-of-speech number sequence and a word number sequence of each word in the question statement; and inputs the part-of-speech number sequence and the word number sequence of each word into a second sequence labeling model for calculation, to obtain a location of the to-be-complemented ellipted component in the question statement. For example, the question statement is "how tall is he?". The complementing apparatus inputs part-of-speech tagging and word number sequences of "tall", "how", and "?" in the question statement into the second sequence labeling model for calculation, to obtain a calculation result "1 0 0", and the complementing apparatus determines, based on the calculation result "1 0 0", that a general component is ellipted in the $0^{th}$ location (that is, before "tall").

Before using the second sequence labeling model, the complementing apparatus obtains the second sequence labeling model through training based on the CNN and the RNN. For a specific process, refer to related descriptions of obtaining the first sequence labeling model through training. Details are not described herein again.

Further, the complementing apparatus complements the ellipted general component in the question statement. Specifically, the complementing apparatus scores a plurality of nouns or noun phrases in the previous statement by using the complementation model; selects, from the plurality of nouns or noun phrases, a candidate noun or noun phrase whose score is higher than a third threshold as the to-be-complemented ellipted component; and if there are a plurality of candidate nouns or noun phrases whose scores are higher than the third threshold, selects, from the plurality of candidate nouns or noun phrases whose scores are higher than the third threshold, a candidate noun or noun phrase with a highest score as the to-be-complemented ellipted component. The complementing apparatus complements the question statement based on the to-be-complemented ellipted component.

If there are a plurality of nouns or noun phrases whose scoring results are higher than the third threshold, the complementing apparatus stores, in the candidate table, a candidate noun or noun phrase, other than a candidate noun or noun phrase with a highest scoring result, that is in candidate antecedents whose scoring results are higher than the third threshold and whose absolute value of a difference between a scoring result and the highest scoring result is less than the fifth threshold.

For example, the question statement is "how tall is he?". The complementing apparatus determines that a component is ellipted before "tall" in the question statement "how tall is he?" based on a third sequence labeling model. Nouns in a previous statement of the question statement "Yao Ming is a basketball player" include "Yao Ming", "basketball", and "player". The complementing apparatus scores the candidate nouns "Yao Ming", "basketball", and "player" respectively by using the complementation model, and scoring results are: Yao Ming: 3.6, basketball: 0.6, player: 2.7, and a blank word: 1.5. The complementing apparatus determines the scoring result of the blank word as the third threshold. Therefore, nouns whose scoring results are higher than the third threshold include "Yao Ming" and "player". Because the scoring result of "Yao Ming" is higher than the scoring result of "player", the complementing apparatus determines the candidate noun "Yao Ming" as a to-be-complemented ellipted component, and complements the question statement. In other words, a complemented question statement is "how tall is Yao Ming?".

Further, if a sixth threshold is 1, because an absolute value of a difference between the score of the candidate noun "player" and the highest score is 0.9, which is less than the sixth threshold, the complementing apparatus stores the candidate noun "player" in the candidate table.

Before scoring the plurality of candidate notional words in the previous statement by using the complementation model, the complementing apparatus obtains a third training dataset, and then trains the CNN based on the third training dataset, to obtain the complementation model. For a specific process, refer to related descriptions in which the complementing apparatus trains the RNN and the CNN based on the first training dataset to obtain the resolution model. Details are not described herein again.

S605: The complementing apparatus merges the resolved question statement and the question statement after ellipsis resolution, to obtain a merged question statement.

For example, it is assumed that historical dialog statements include "what phone did Xiao Ming buy?" and "Huawei phone", and a question statement is "how much did he pay for it?". For the question statement, the complementing apparatus determines a to-be-resolved item in the question statement, and resolves the to-be-resolved item based on the historical dialog statement, to obtain a resolved question statement "how much did Xiao Ming pay for it?". The complementing apparatus determines that the question statement is ellipted, and complements an ellipted part in the question statement based on the historical dialog statement, to obtain a question statement after ellipsis resolution "how much did he pay for a Huawei phone?". The complementing apparatus merges the resolved question statement and the question statement after ellipsis resolution, to obtain a merged question statement "how much did Xiao Ming pay for a Huawei phone?". In this way, the complementing apparatus obtains three complementation results.

It should be noted that, because in the question statement "how much did he pay for it?", no stem component is ellipted and no notional word corresponding to an attribute word is missing, that the complementing apparatus performs ellipsis complementation on the question statement is specifically to complement the ellipted part in the question statement. If both the stem component and the notional word corresponding to the attribute word are ellipted in the question statement, the complementing apparatus complements the ellipted stem component and the ellipted notional word corresponding to the attribute word that are in the question statement, to obtain two complementation results. The complementing apparatus merges the two complementation results with the resolved question statement, to obtain two more complementation results. In this way, the complementing apparatus obtains seven complementation results.

S606: The complementing apparatus scores the resolved question statement, the question statement after ellipsis resolution, and the merged question statement, and determines a target complemented question statement based on a scoring result.

Specifically, the complementing apparatus scores each of the resolved question statement, the question statement after ellipsis resolution, and the merged question statement, to obtain an integrity score and a possibility score of each question statement. The integrity score of each question statement is used to represent an integrity degree of a subject, a verb, and an object of a stem of the statement, and the possibility score of each question statement is used to represent a probability that all words in the statement form one sentence. The complementing apparatus performs weighted summation on the integrity score and the possibility score of each question statement, to obtain a weighted score of the question statement. The complementing apparatus determines the question statement with a highest weighted score as the target complemented question statement.

The complementing apparatus performs linear weighting on the integrity score and the possibility score of each question statement, to obtain a weighted score of the question statement, and which can be expressed in formula as: score=a*score1+b*score2, where score is the weighted score, score1 is the integrity score, score2 is the possibility score, and both a and b are weights.

Further, the complementing apparatus analyzes a stem of each question statement by using syntax analysis, and then scores the question statement based on the integrity of the subject, the verb, and the object, to obtain the integrity score of the question statement. Integrity of each question statement is strongly related to a pronoun or an interrogative pronoun in the question statement. In other words, the pronoun or the interrogative pronoun in each question statement affects the integrity score of the question statement.

The complementing apparatus scores the possibility that all words in each question statement form one sentence by using a language model, to obtain a feasibility score of the question statement. Before that, the complementing apparatus trains an n-gram model or a neural network language model based on massive question and answer corpora, to obtain the foregoing language model.

For example, the merged question statement is "how much did Xiao Ming pay for a Huawei phone?", and an integrity score and a probability score of the merged question statement are 1 respectively; the resolved question statement is "how much did Xiao Ming pay for it?", and an integrity score and a probability score of the resolved question statement are 0.9 and 1 respectively; and the question statement after ellipsis resolution is "how much did he pay for a Huawei phone?", and an integrity score and a probability score of the question statement after ellipsis resolution are 0.9 and 1 respectively. Weighted scores for the three question statements are as follows.

The merged question statement: How much did Xiao Ming pay for a Huawei phone, which is score=0.5*1+0.5*1=1;
 the resolved question statement: How much did Xiao Ming pay for it, which is score=0.5*0.9+0.5*1=0.95; and
 the question statement after ellipsis resolution: How much did he pay for a Huawei phone, which is score=0.5*0.9+0.5*1=0.95.

The complementing apparatus determines the merged question statement "how much did Xiao Ming pay for a Huawei phone?" with the highest weighted score as the target complemented question statement.

It should be noted that both the weight a and the weight b in the foregoing formula are 0.5.

In a feasible embodiment, after determining the target complemented question statement, the complementing apparatus determines whether candidate complementation items (including the candidate antecedent and the candidate notional word and/or noun) are stored in the candidate table. If determining that the candidate complementation items are stored in the candidate table, the complementing apparatus generates a query statement based on the candidate complementation item, and initiates a query dialog. The query statement includes the candidate complementation item. The complementing apparatus obtains a user answer statement, extracts, from the user answer statement, a candidate complementation item selected by the user, and modifies the target complemented question statement based on the candidate complementation item selected by the user, to obtain a modified question statement.

Further, if the candidate complementation item extracted from the user answer statement is inconsistent with the candidate complementation item in the candidate table, the complementing apparatus does not modify the target complemented question statement.

For example, the target complemented question statement is "what is the population of Hebei?", and a candidate complementation item "Shijiazhuang" is stored in the candidate table. The complementing apparatus generates a query statement "do you mean Shijiazhuang or Hebei?" based on the candidate complementation item "Shijiazhuang?", and initiates the query dialog. The complementing apparatus obtains a user answer statement "I mean Shijiazhuang", extracts, from the answer statement, a candidate complementation item "Shijiazhuang" selected by the user, and then modifies the target complemented question statement based on the candidate complementation item "Shijiazhuang", to obtain a modified question statement "what is the population of Shijiazhuang?".

For another example, the target complemented question statement is "how much did Xiao Ming pay for a Huawei phone?", and a candidate complementation item "iPhone" is stored in the candidate table. The complementing apparatus generates a query statement "do you mean a Huawei phone or an iPhone?" based on the candidate complementation item "iPhone", and initiates the query dialog. The complementing apparatus obtains a user answer statement "I mean the iPhone", extracts the candidate complementation item "iPhone" from the answer statement, and then modifies the target complemented question statement based on the candidate complementation item "iPhone", to obtain a modified question statement "how much did Xiao Ming pay for an iPhone?".

In a feasible embodiment, the complementing apparatus generates a training corpus based on the question statement, the modified question statement, and the historical dialog statement. The training corpus is used to further train the resolution model and the complementation model, so that a result obtained through processing by using the resolution model and the complementation model is more accurate. The historical dialog statement includes but is not limited to a previous statement of the question statement and an answer statement of the user for the previous statement. For example, the training corpus includes historical dialog data "where is the provincial capital of Hebei?" and "Shijiazhuang", a question statement "what is the population?", and a modified question statement "what is the population of Shijiazhuang?".

S607: The complementing apparatus generates a reply statement for the target complemented question statement or the modified question statement.

Specifically, the complementing apparatus obtains, from a local database or a third-party server, an answer to the target complemented question statement or the modified question statement, where a statement including the answer is the reply statement.

For example, for the target complemented question statement "what is the population of Shijiazhuang?", the complementing apparatus obtains the population of Shijiazhuang from the local database or the third-party server, and generates a reply statement "the population of Shijiazhuang is XXXX" based on the population of Shijiazhuang.

In a feasible embodiment, when initiating a dialog based on the reply statement, the complementing apparatus detects whether the user needs to perform an error correction operation. If determining that the user needs to perform the error correction operation, the complementing apparatus performs the error correction operation. Specifically, the complementing apparatus determines, according to a syntax rule, a sentence pattern, and a historical candidate complementation item, whether the user initiates an error correction dialog. If determining that the user initiates the error correction dialog, the complementing apparatus extracts a candidate complementation item from the error correction dialog, and modifies the target complemented question statement or the modified question statement based on the candidate complementation item, to obtain a new question statement. The complementing apparatus generates a new reply statement for the new question statement.

For example, it assumed that a reply statement that is provided by the complementing apparatus to "what is the population of Shijiazhuang?" (namely, the target complemented question statement or the modified question statement) is "the population of Shijiazhuang is 108,799 million". The user initiates an error correction dialog "I mean Hebei or, not Shijiazhuang, I mean Hebei", and the complementing apparatus determines that the user needs to perform the error correction operation. The complementing apparatus extracts a candidate complementation item "Hebei" from the error correction dialog, and modifies the target complemented question statement or the modified question statement based on the candidate complementation item "Hebei", to obtain a new question statement "what is the population of Hebei?".

Further, the complementing apparatus obtains an answer to the new question statement from the local database or the third-party server, and generates a reply statement for the new question statement based on the answer.

Further, a new training corpus is generated based on the question statement, the new question statement, and the historical dialog statement. The new training corpus is used to further train the resolution model and the complementation model, so that a result obtained through processing by using the resolution model and the complementation model is more accurate. The historical dialog statement includes but is not limited to a previous statement of the question statement and an answer statement of the user for the previous statement. For example, the training corpus includes historical dialog data "where is the provincial capital of Hebei?" and "Shijiazhuang", a question statement "what is the population?", and a modified question statement "what is the population of Hebei?".

It can be learned that, in the solution in this embodiment of this application, when coreference resolution is performed, coreference localization is performed by introducing a sequence labeling model, so that accuracy of the coreference localization is improved, and a pronoun that does not need to be resolved is excluded. When performing ellipsis detection and complementation, more types of ellipses can be detected by the complementing apparatus by introducing rule-based sentence component loss detection, loss detection of a notional word corresponding to an attribute word, and sequence labeling model-based general ellipsis detection, and the complementing apparatus can perform targeted complementation. This achieves a better ellipsis complementation effect. Introduction of a CNN-based resolution/complementation model resolves a problem in the conventional technology that an error is easily introduced because only a lexical co-occurrence frequency is used to determine complementation, and semantic similarities between to-be-complemented statements and candidate complementation items can be better mined from massive question and answer corpora. This improves complementation performance. After complementation is completed, an effect of combining a plurality of complementation results may be evaluated as a whole by using a comprehensive effect evaluation module. This resolves a problem that in the conventional technology, an error may be introduced by simply combining a plurality of results, improves a final complementation effect, and obtains better complementation performance. Introduction of clarification and error correction mechanisms can update an existing complementation model based on user feedbacks and continuously optimize the complementation effect.

Figure 7:
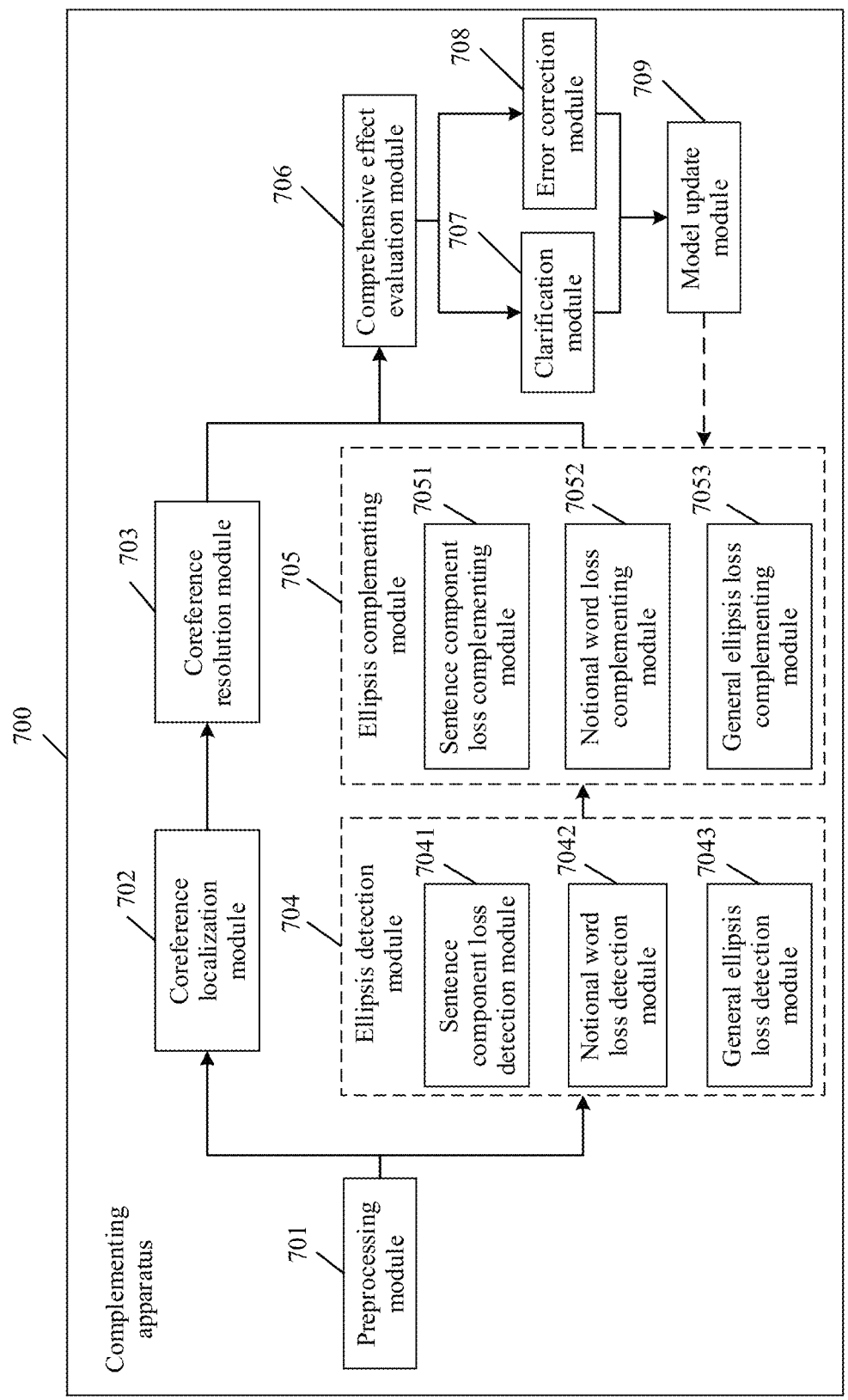
FIG. 7 is a schematic structural diagram of a complementing apparatus according to an embodiment of the present disclosure.

FIG. 7 is a schematic structural diagram of a recommendation apparatus according to an embodiment of the present disclosure. As shown in FIG. 7, the recommendation apparatus 700 includes:

a preprocessing module 701, configured to obtain a historical dialog statement and a question statement input by a user;
a coreference localization module 702, configured to obtain location information of a to-be-resolved item in the question statement;
a coreference resolution module 703, configured to resolve the to-be-resolved item in the question statement based on the historical dialog statement and the location information of the to-be-resolved item, to obtain a resolved question statement;
an ellipsis detection module 704, configured to: determine whether a component in the question statement is ellipted; if determining that a component in the question statement is ellipted, an ellipsis complementing module 705, configured to: complement the ellipted component based on the historical dialog statement, to obtain a question statement after ellipsis resolution; and
a comprehensive effect evaluation module 706, configured to: merge the resolved question statement and the question statement after ellipsis resolution, to obtain a merged question statement; and determine a target complemented question statement from the resolved question statement, the question statement after ellipsis resolution, and the merged question statement. The target complemented question statement is a question statement, in the resolved question statement, the question statement after ellipsis resolution, and the merged question statement, with a highest stem sentence integrity degree and a highest probability that all words in a sentence form one sentence.

In a feasible embodiment, the coreference localization module 702 is specifically configured to:
obtain a word number sequence and a part-of-speech number sequence of the question statement, where the word number sequence includes a number corresponding to each word in the question statement, and the part-of-speech number sequence includes a number corresponding to a part of speech of each word in the question statement; and input the word number sequence and the part-of-speech number sequence of the question statement into a first sequence labeling model for calculation, to obtain the location information of the to-be-resolved item.

In a feasible embodiment, the historical dialog statement includes a previous statement of the question statement, and the coreference resolution module 703 is specifically configured to:
obtain one or more candidate antecedents from the previous statement of the question statement, where the candidate antecedent is a noun or a noun phrase in the previous statement; score each of the one or more candidate antecedents by using a resolution model, to obtain a score of each candidate antecedent; select, from the one or more candidate antecedents, candidate antecedents whose scores are higher than a first threshold; and resolve the to-be-resolved item in the question statement by using a candidate antecedent with a highest score in the candidate antecedents whose scores are higher than the first threshold, to obtain the resolved question statement.

In a feasible embodiment, the ellipsis detection module 704 includes:
a sentence component loss detection module 7041, configured to determine whether a stem sentence component in the question statement is ellipted;
a notional word loss detection module 7042, configured to determine whether a notional word that is in the question statement and that is corresponding to an attribute word is ellipted; or
a general ellipsis loss detection module 7043, configured to determine whether a general component in the question statement is ellipted.

In a feasible embodiment, the historical dialog statement includes the previous statement of the question statement, and the sentence component loss detection module 7041 is specifically configured to:

determine whether a sentence pattern of the question statement and a sentence pattern of the previous statement meet a preset condition, or determine whether a body of the sentence pattern of the question statement is a proper subset of the previous statement; if determining that the sentence pattern of the question statement and the sentence pattern of the previous statement meet the preset condition, or determining that a stem of the sentence pattern of the question statement is the proper subset of the previous statement, determine whether there is a same-type relationship between a phrase in the question statement and a phrase in the previous statement; and if there is the same-type relationship between the phrase in the question statement and the phrase in the previous statement, determine that the stem sentence component in the question statement is ellipted.

In a feasible embodiment, the preset condition includes:

The sentence pattern of the previous statement is an interrogative sentence, and the sentence pattern of the question statement is an interrogative sentence or the body of the question statement is a combination of "what about + noun phrase?"; or the sentence pattern of the previous statement is a declarative sentence, and the sentence pattern of the question statement is an interrogative sentence or the body of the question statement is a combination of "what about + noun phrase?" or a combination of "noun phrase?". The missing stem sentence component can be detected by introducing rule-based sentence component loss detection, and the missing stem sentence component can be complemented. This improves a complementation effect.

In a feasible embodiment, when determining whether a stem of the sentence pattern of the question statement is a proper subset of the previous statement, the sentence component loss detection module 7041 is specifically configured to:

extract a stem of the previous statement and the stem of the question statement; and determine whether a non-noun phrase part in the stem of the question statement is the proper subset of the stem of the previous statement.

In a feasible embodiment, the notional word loss detection module 7042 is specifically configured to:

remove a meaningless word from a sentence head of the question statement, to obtain a processed question statement; determine whether a sentence head word in the processed question statement is the attribute word; and if the sentence head word in the processed question statement is the attribute word, determine that the notional word that is in the question statement and that is corresponding to the attribute word is ellipted. A loss of the notional word corresponding to the attribute word in the sentence can be detected by introducing targeted loss detection of the notional word corresponding to the attribute word, and the notional word corresponding to the attribute word is complemented. This improves an effect of complementing missing semantics.

In a feasible embodiment, the general ellipsis loss detection module 7043 is specifically configured to:

obtain the part-of-speech number sequence and the word number sequence of each word in the question statement, where the word number sequence includes the number corresponding to each word in the question statement, and the part-of-speech number sequence includes the number corresponding to the part of speech of each word in the question statement; and input the word number sequence and the part-of-speech number sequence of each word into a second sequence labeling model for calculation, to obtain location information of the ellipted general component in the question statement. The effect of complementing missing semantics is improved by introducing sequence labeling model-based general ellipsis detection and performing targeted complementation.

In a feasible embodiment, the ellipsis complementing module 705 includes a sentence component loss complementing module 7051, and the sentence component loss complementing module 7051 is specifically configured to:

retain an overall structure of the previous statement, and replace the phrase in the previous statement with the phrase in the question statement, to obtain the question statement after ellipsis resolution. There is the same-type relationship between the phrase in the previous statement and the phrase in the question statement.

In a feasible embodiment, the historical dialog statement includes the previous statement of the question statement, the ellipsis complementing module 705 includes a notional word loss complementing module 7052, and the notional word loss complementing module 7052 is specifically configured to:

obtain one or more candidate notional words in the previous statement; score each candidate notional word in the one or more candidate notional words in the previous statement by using a complementation model, to obtain a score of each candidate notional word; obtain, from the one or more candidate notional words, candidate notional words whose scores are higher than a second threshold; and complement, based on a candidate notional word with a highest score in the candidate notional words whose scores are higher than the second threshold, the notional word corresponding to the ellipted attribute word in the question statement, to obtain the question statement after ellipsis resolution.

In a feasible embodiment, the historical dialog statement includes the previous statement of the question statement, the ellipsis complementing module 705 includes a general ellipsis loss complementing module 7053, and the general ellipsis loss complementing module 7053 is specifically configured to:

score each noun/noun phrase in one or more nouns/noun phrases in the previous statement by using a complementation model, to obtain a score of each noun/noun phrase; obtain, from the one or more nouns/noun phrases, nouns/noun phrases whose scores are higher than a third threshold; and complement the ellipted general component in the question statement based on a noun/noun phrase with a highest score in the nouns/noun phrases whose scores are higher than the third threshold, to obtain the question statement after ellipsis resolution.

In a feasible embodiment, the comprehensive effect evaluation module 706 is specifically configured to:

score each of the resolved question statement, the question statement after ellipsis resolution, and the merged question statement, to obtain an integrity score and a possibility score of each question statement, where the integrity score is used to represent an integrity degree of a subject, a verb, and an object of a stem of the statement, and the possibility score is used to represent a probability that all words in the statement form one sentence; perform weighted summation on the integrity score and the possibility score of each question statement, to obtain a weighted score of the question statement; and determine the question statement with a highest weighted score as the target complemented question statement.

In a feasible embodiment, the complementing apparatus 700 further includes:

a clarification module 707, configured to: determine, as a candidate complementation item, a candidate antecedent that is in the candidate antecedents whose scores are higher than the first threshold and whose absolute value of a difference between a score and the highest score is less than a fourth threshold, and store the candidate complementation item in a candidate table; determine, as a candidate complementation item, a candidate noun or noun phrase that is in candidate nouns or noun phrases whose scores are higher than the second threshold and whose absolute value of a difference between a score and the highest score is less than a fifth threshold, and store the candidate complementation item in the candidate table; or determine, as a candidate complementation item, a candidate noun or noun phrase that is in the candidate nouns or noun phrases whose scoring results are higher than the third threshold and whose absolute value of a difference between a scoring result and a highest scoring result is less than a sixth threshold, and store the candidate complementation item in the candidate table.

In a feasible embodiment, the clarification module 707 is further configured to:

if the candidate table includes the candidate complementation item, perform a clarification operation. That a clarification operation is performed includes:

generating a query statement based on the candidate complementation item, and initiating a query dialog, where the query statement includes the candidate complementation item; obtaining a user answer statement, and obtaining, from the answer statement, a candidate complementation item selected by the user; and if the candidate complementation item selected by the user is consistent with the candidate complementation item in the candidate table, modifying the target complemented question statement based on the candidate complementation item selected by the user, to obtain a modified question statement.

In a feasible embodiment, the clarification module 707 is further configured to:

obtain, from a local database or a third-party server, an answer to the target complemented question statement or the modified question statement, and generate a reply statement based on the answer.

In a feasible embodiment, the complementing apparatus 700 further includes:

an error correction module 708, configured to: determine, according to a syntax rule, a sentence pattern, and a historical candidate complementation item, whether the user initiates an error correction dialog; if determining that the user initiates the error correction dialog, extract a candidate option item from the error correction dialog, and modify the target complemented question statement or the modified question statement based on the candidate option item, to obtain a new question statement; and generate a new reply statement for the new question statement.

In a feasible embodiment, the preprocessing module 701 is further configured to: after obtaining the question statement, perform preprocessing on the question statement, including but not limited to word segmentation, part-of-speech tagging, sentence problem type identification, stem sentence extraction, and the like.

In a feasible embodiment, the complementing apparatus 700 further includes:

a model update module 709, configured to: after the clarification operation or the error correction is performed, generate a training corpus based on the question statement, the historical dialog statement, the modified question statement, or the new question statement, to update the complementation model and the resolution model.

It should be noted that the foregoing modules (the preprocessing module 701, the coreference localization module 702, the coreference resolution module 703, the ellipsis detection module 704, the ellipsis complementing module 705, the comprehensive effect evaluation module 706, the clarification module 707, the error correction module 708, and the model update module 709) are configured to perform related content of the method shown in steps S601 to S603. The preprocessing module 701 is configured to perform related content of steps S601 and S602. The coreference localization module 702 and the coreference resolution module 703 are configured to perform related content of step S603. The ellipsis detection module 704 and the ellipsis complementing module 705 are configured to perform related content of step S604. The comprehensive effect evaluation module 706, the clarification module 707, the error correction module 708, and the model update module 709 are configured to perform related content of steps S605, S606, and S607.

In this embodiment, the recommendation apparatus 1100 is presented in a form of a unit. The "unit" herein may be an application-specific integrated circuit (ASIC), a processor and memory for executing one or more software or firmware programs, an integrated logic circuit, and/or another device that can provide the foregoing functions. Further, the preprocessing module 701, the coreference localization module 702, the coreference resolution module 703, the ellipsis detection module 704, the ellipsis complementing module 705, the comprehensive effect evaluation module 706, the clarification module 707, the error correction module 708, and the model update module 709 can be implemented by using a processor 801 of a complementing apparatus shown in FIG. 8.

Figure 8:
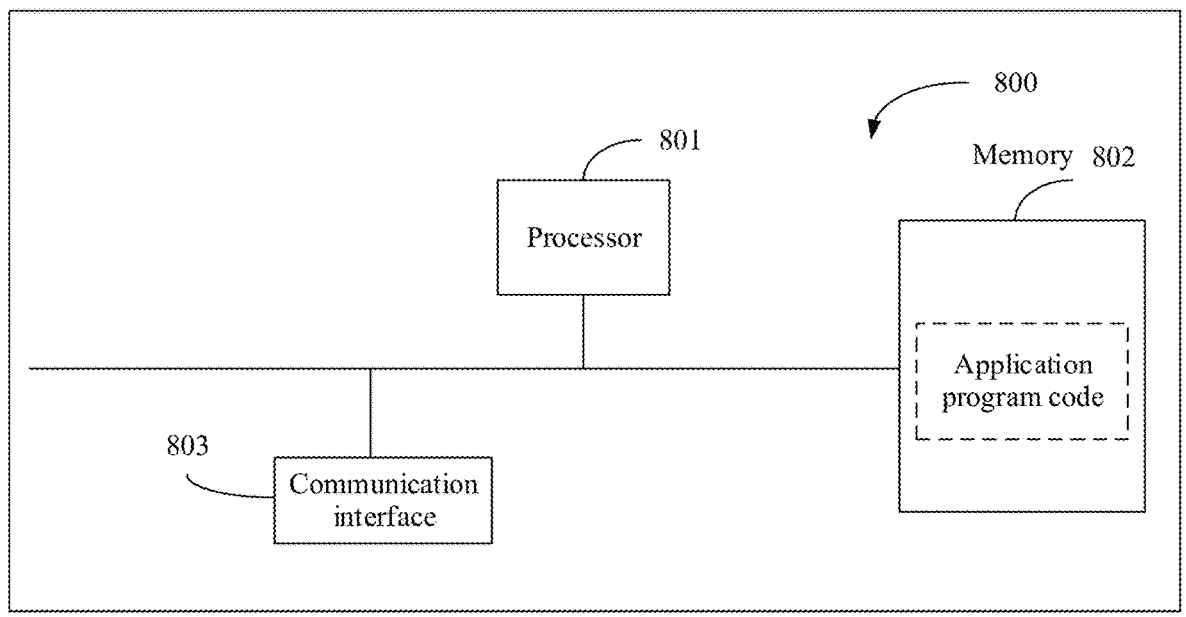
FIG. 8 is a schematic structural diagram of another complementing apparatus according to an embodiment of the present disclosure.

The complementing apparatus shown in FIG. 8 may be implemented by using a structure in FIG. 8. The complementing apparatus or the training apparatus includes at least one processor 801, at least one memory 802, and at least one communication interface 803. The processor 801, the memory 802, and the communication interface 803 are connected and communicate with each other through a communication bus.

The communication interface 803 is configured to communicate with another device or a communication network, for example, the Ethernet, a radio access network (RAN), or a wireless local area network (WLAN).

The memory 802 may be a read-only memory (ROM), another type of static storage device capable of storing static information and instructions, a random access memory (RAM), or another type of dynamic storage device capable of storing information and instructions, or may be an electrically erasable programmable read-only memory (EEPROM), a compact disc read-only memory (CD-ROM), another compact disc storage, an optical disc storage (including a compressed optical disc, a laser disc, an optical disc, a digital versatile disc, a Blu-ray optical disc, and the like), a magnetic disk storage medium, another magnetic storage device, or any other medium capable of including or storing expected program code in a form of instructions or data structures and capable of being accessed by a computer, but is not limited thereto. The memory may exist independently, and is connected to the processor through a bus. The memory may alternatively be integrated with the processor.

The memory 802 is configured to store application program code for executing the foregoing solutions, and the processor 801 controls the execution. The processor 801 is configured to execute the application program code stored in the memory 802.

The code stored in the memory 802 may execute the missing semantics complementing method or the model training method provided above.

The processor 801 may further use one or more integrated circuits to execute a related program, to implement the recommendation method or the model training method in the embodiments of this application.

The processor 801 may be an integrated circuit chip and has a signal processing capability. In an implementation process, steps of the recommendation method in this application may be completed by using a hardware integrated logic circuit or an instruction in a form of software in the processor 801. In an implementation process, the steps of the method for training the status generation model and the selection policy in this application may be completed by using a hardware integrated logic circuit or instructions in a form of software in the processor 801. The foregoing processor 801 may be a general-purpose processor, a digital signal processor (DSP), an ASIC, a field programmable gate array (FPGA) or another programmable logic device, a discrete gate or transistor logic device, or a discrete hardware component. It may implement or perform the methods, the steps, and module block diagrams that are disclosed in the embodiments of this application. The general-purpose processor may be a microprocessor, or the processor may be any conventional processor or the like. Steps of the methods disclosed with reference to the embodiments of this application may be directly executed and accomplished by means of a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 802. The processor 801 reads information in the memory 802, and completes the recommendation method or the model training method in the embodiments of this application in combination with hardware of the processor 801.

The communication interface 803 uses a transceiver apparatus, such as but not limited to a transceiver, to implement communication between a recommendation apparatus or a training apparatus and another device or a communication network. For example, recommendation-related data (a historical recommended object and user behavior for each historical recommended object) or training data may be obtained through the communication interface 803.

The bus may include a path for transmitting information between the components (for example, the memory 802, the processor 801, and the communication interface 803) of the apparatus.

In a possible embodiment, the processor 801 specifically performs the following steps:

obtaining location information of a to-be-resolved item in the question statement, and resolving the to-be-resolved item in the question statement based on the historical dialog statement and the location information of the to-be-resolved item, to obtain a resolved question statement; determining whether a component in the question statement is ellipted, and if determining that a component in the question statement is ellipted, complementing the ellipted component based on the historical dialog statement, to obtain a question statement after ellipsis resolution; merging the resolved question statement and the question statement after ellipsis resolution, to obtain a merged question statement; and determining a target complemented question statement from the resolved question statement, the question statement after ellipsis resolution, and the merged question statement, where the target complemented question statement is a question statement, in the resolved question statement, the question statement after ellipsis resolution, and the merged question statement, with a highest stem sentence integrity degree and a highest probability that all words in a sentence form one sentence.

When performing the step of obtaining location information of a to-be-resolved item in the question statement, the processor 801 specifically performs the following steps:

obtaining a word number sequence and a part-of-speech number sequence of the question statement, where the word number sequence includes a number corresponding to each word in the question statement, and the part-of-speech number sequence includes a number corresponding to a part of speech of each word in the question statement; and inputting the word number sequence and the part-of-speech number sequence of the question statement into a first sequence labeling model for calculation, to obtain the location information of the to-be-resolved item.

In a possible embodiment, the historical dialog statement includes a previous statement of the question statement, when resolving the to-be-resolved item in the question statement based on the historical dialog statement and the location information of the to-be-resolved item, to obtain the resolved question statement, the processor 801 specifically performs the following steps:

obtaining one or more candidate antecedents from the previous statement of the question statement, where the candidate antecedent is a noun or a noun phrase in the previous statement; scoring each of the one or more candidate antecedents by using a resolution model, to obtain a score of each candidate antecedent; selecting, from the one or more candidate antecedents, candidate antecedents whose scores are higher than a first threshold; and resolving the to-be-resolved item in the question statement by using a candidate antecedent with a highest score in the candidate antecedents whose scores are higher than the first threshold, to obtain the resolved question statement.

In a feasible embodiment, the determining whether a component in the question statement is ellipted includes:

determining whether a stem sentence component in the question statement is ellipted; determining whether a notional word that is in the question statement and that is corresponding to an attribute word is ellipted; or determining whether a general component in the question statement is ellipted.

In a feasible embodiment, the historical dialog statement includes the previous statement of the question statement, and when performing the step of determining whether a stem sentence component in the question statement is ellipted, the processor 801 is specifically configured to perform the following steps:

determining whether a sentence pattern of the question statement and a sentence pattern of the previous statement meet a preset condition, or determining whether a body of the sentence pattern of the question statement is a proper subset of the previous statement; if determining that the sentence pattern of the question statement and the sentence pattern of the previous statement meet the preset condition, or determining that a stem of the sentence pattern of the question statement is the proper subset of the previous statement, determining whether there is a same-type relationship between a phrase in the question statement and a phrase in the previous statement; and if there is the same-type relationship between the phrase in the question statement and the phrase in the previous statement, determining that the stem sentence component in the question statement is ellipted.

In a feasible embodiment, the preset condition includes:
the sentence pattern of the previous statement is an interrogative sentence, and the sentence pattern of the question statement is an interrogative sentence or the body of the question statement is a combination of "what about + noun phrase?"; or
the sentence pattern of the previous statement is a declarative sentence, and the sentence pattern of the question statement is an interrogative sentence or the body of the question statement is a combination of "what about + noun phrase?" or a combination of "noun phrase?". The missing stem sentence component can be detected by introducing rule-based sentence component loss detection, and the missing stem sentence component can be complemented. This improves a complementation effect.

In a feasible embodiment, when performing the step of determining whether a stem of the sentence pattern of the question statement is a proper subset of the previous statement, the processor 801 is specifically configured to perform the following steps:

extracting a stem of the previous statement and the stem of the question statement; and determining whether a non-noun phrase part in the stem of the question statement is the proper subset of the stem of the previous statement.

In a feasible embodiment, when performing the step of determining whether a notional word that is in the question statement and that is corresponding to an attribute word is ellipted, the processor 801 is specifically configured to perform the following step:

removing a meaningless word from a sentence head of the question statement, to obtain a processed question statement; determining whether a sentence head word in the processed question statement is the attribute word; and if the sentence head word in the processed question statement is the attribute word, determining that the notional word that is in the question statement and that is corresponding to the attribute word is ellipted.

In a feasible embodiment, when performing the step of determining whether a general component in the question statement is ellipted, the processor 801 is specifically configured to perform the following steps:

obtaining the part-of-speech number sequence and the word number sequence of each word in the question statement, where the word number sequence includes the number corresponding to each word in the question statement, and the part-of-speech number sequence includes the number corresponding to the part of speech of each word in the question statement; and inputting the word number sequence and the part-of-speech number sequence of each word into a second sequence labeling model for calculation, to obtain location information of the ellipted general component in the question statement.

In a feasible embodiment, when performing the step of complementing the ellipted component based on the historical dialog statement, to obtain a question statement after ellipsis resolution, the processor 801 is specifically configured to perform the following steps:

retaining an overall structure of the previous statement, and replacing the phrase in the previous statement with the phrase in the question statement, to obtain the question statement after ellipsis resolution. There is the same-type relationship between the phrase in the previous statement and the phrase in the question statement.

In a feasible embodiment, the historical dialog statement includes the previous statement of the question statement, and when performing the step of complementing the ellipted component based on the historical dialog statement, to obtain a question statement after ellipsis resolution, the processor 801 is specifically configured to perform the following steps:

obtaining one or more candidate notional words in the previous statement; scoring each candidate notional word in the one or more candidate notional words in the previous statement by using a complementation model, to obtain a score of each candidate notional word; obtaining, from the one or more candidate notional words, candidate notional words whose scores are higher than a second threshold; and complementing, based on a candidate notional word with a highest score in the candidate notional words whose scores are higher than the second threshold, the notional word corresponding to the ellipted attribute word in the question statement, to obtain the question statement after ellipsis resolution.

In a feasible embodiment, the historical dialog statement includes the previous statement of the question statement, and when performing the step of complementing the ellipted component based on the historical dialog statement, to obtain a question statement after ellipsis resolution, the processor 801 is specifically configured to perform the following steps:

scoring each noun/noun phrase in one or more nouns/noun phrases in the previous statement by using a complementation model, to obtain a score of each noun/noun phrase; obtaining, from the one or more nouns/noun phrases, nouns/noun phrases whose scores are higher than a third threshold; and complementing the ellipted general component in the question statement based on a noun/noun phrase with a highest score in the nouns/noun phrases whose scores are higher than the third threshold, to obtain the question statement after ellipsis resolution.

In a feasible embodiment, when performing the step of determining a target complemented question statement from the resolved question statement, the question statement after ellipsis resolution, and the merged question statement, the processor 801 is specifically configured to perform the following steps:

scoring each of the resolved question statement, the question statement after ellipsis resolution, and the merged question statement, to obtain an integrity score and a possibility score of each question statement, where the integrity score is used to represent an integrity degree of a subject, a verb, and an object of a stem of the statement, and the possibility score is used to represent a probability that all words in the statement form one sentence; performing weighted summation on the integrity score and the possibility score of each question statement, to obtain a weighted score of the question statement; and determining the question statement with a highest weighted score as the target complemented question statement.

In a feasible embodiment, the processor 801 is further configured to perform the following steps:

determining, as a candidate complementation item, a candidate antecedent that is in the candidate antecedents whose scores are higher than the first threshold and whose absolute value of a difference between a score and the highest score is less than a fourth threshold, and storing the candidate complementation item in a candidate table; determining, as a candidate complementation item, a candidate noun or noun phrase that is in candidate nouns or noun phrases whose scores are higher than the second threshold and whose absolute value of a difference between a score and the highest score is less than a fifth threshold, and storing the candidate complementation item in the candidate table; or determining, as a candidate complementation item, a candidate noun or noun phrase that is in the candidate nouns or noun phrases whose scoring results are higher than the third threshold and whose absolute value of a difference between a scoring result and a highest scoring result is less than a sixth threshold, and storing the candidate complementation item in the candidate table.

In a feasible embodiment, the processor 801 is further configured to perform the following step:

if the candidate table includes the candidate complementation item, performing a clarification operation. That a clarification operation is performed includes:

generating a query statement based on the candidate complementation item, and initiating a query dialog, where the query statement includes the candidate complementation item; obtaining a user answer statement, and obtaining, from the answer statement, a candidate complementation item selected by the user; and if the candidate complementation item selected by the user is consistent with the candidate complementation item in the candidate table, modifying the target complemented question statement based on the candidate complementation item selected by the user, to obtain a modified question statement.

In a feasible embodiment, the processor 801 is further configured to perform the following steps:

obtaining, from a local database or a third-party server, an answer to the target complemented question statement or the modified question statement, and generating a reply statement based on the answer.

In a feasible embodiment, the processor 801 is further configured to perform the following steps:

determining, according to a syntax rule, a sentence pattern, and a historical candidate complementation item, whether the user initiates an error correction dialog; if determining that the user initiates the error correction dialog, extracting a candidate option item from the error correction dialog, and modifying the target complemented question statement or the modified question statement based on the candidate option item, to obtain a new question statement; and generating a new reply statement for the new question statement.

A clarification mechanism and an error correction mechanism are introduced, and an existing complementation model and an existing sequence labeling model can be updated based on user feedback, to continuously optimize the complementation effect.

In a feasible embodiment, the processor 801 is further configured to perform the following step:

after the question statement is obtained, performing preprocessing on the question statement, including but not limited to word segmentation, part-of-speech tagging, sentence problem type identification, stem sentence extraction, and the like.

In a feasible embodiment, the processor 801 is further configured to perform the following step:

after the clarification operation or the error correction is performed, generating a training corpus based on the question statement, the historical dialog statement, the modified question statement, or the new question statement, to update the complementation model and the resolution model.

An embodiment of the present disclosure provides a computer storage medium. The computer storage medium stores a computer program. The computer program includes program instructions. When the program instructions are executed by a processor, the processor is enabled to perform some or all steps of any missing semantics complementing method described in the foregoing method embodiments.

It should be noted that, for ease of description, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present disclosure essentially, or the part contributing to the prior art, or all or some of the technical solutions may be implemented in the form of a software product. The software product is stored in a storage and includes several instructions for instructing a computer device (which may be a personal computer, a server, or a network device) to perform all or some of the steps of the methods described in the embodiments of the present disclosure. The foregoing memory includes any medium that can store program code, such as a USB flash drive, a ROM, a RAM, a removable hard disk, a magnetic disk, or an optical disc.

A person of ordinary skill in the art may understand that all or some of the steps of the methods in the embodiments may be implemented by a program instructing related hardware. The program may be stored in a computer readable memory. The memory may include: a flash memory, a ROM, a RAM, a magnetic disk, or an optical disc.

The embodiments of the present disclosure are described in detail above. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A missing semantics complementing method, comprising:
    obtaining a historical dialog statement and a question statement input by a user;
    obtaining location information of a to-be-resolved item in the question statement, and resolving the to-be-resolved item in the question statement based on the historical dialog statement and the location information of the to-be-resolved item, to obtain a resolved question statement, wherein the location information is obtained based on a first sequence labeling model that comprises a neural network;
    determining that a component in the question statement is ellipted, and in response to determining that a component in the question statement is ellipted, complementing the ellipted component based on the historical dialog statement to obtain a question statement after ellipsis resolution;
    merging the resolved question statement and the question statement after ellipsis resolution to obtain a merged question statement; and
    determining a target complemented question statement from the resolved question statement, the question statement after ellipsis resolution, and the merged question statement in the resolved question statement, wherein the target complemented question statement is a question statement with a highest stem sentence integrity degree and a highest probability that all words in a sentence form one sentence selected from one of the resolved question statement, the question statement after ellipsis resolution, and the merged question statement,
    wherein the historical dialog statement comprises a previous statement to the question statement,
    wherein the determining that the component in the question statement is ellipted comprises:
        determining that a stem sentence component in the question statement is ellipted,
        determining that a notional word that is in the question statement and corresponds to an attribute word is ellipted, or
        determining that a general component in the question statement is ellipted; and
    wherein determining that the stem sentence component in the question statement is ellipted comprises:
        determining that a sentence pattern of the question statement and a sentence pattern of the previous statement meet a preset condition or determining that a body of the sentence pattern of the question statement is a proper subset of the previous statement;
        in response to determining that the sentence pattern of the question statement and the sentence pattern of the previous statement meet the preset condition or determining that the body of the sentence pattern of the question statement is the proper subset of the previous statement, determining whether there is a same-type relationship between a phrase in the question statement and a phrase in the previous statement; and
        in response to there being the same-type relationship between the phrase in the question statement and the phrase in the previous statement, determining that the stem sentence component in the question statement is ellipted.

2. The method according to claim 1, wherein the obtaining location information of the to-be-resolved item in the question statement comprises:
    obtaining a word number sequence and a part-of-speech number sequence of the question statement, wherein the word number sequence comprises a number corresponding to each word in the question statement, and the part-of-speech number sequence comprises a number corresponding to a part of speech of each word in the question statement; and
    inputting the word number sequence and the part-of-speech number sequence of the question statement into the first sequence labeling model for calculation to obtain the location information of the to-be-resolved item.

3. The method according to claim 1, wherein the resolving the to-be-resolved item in the question statement based on the historical dialog statement and the location information of the to-be-resolved item to obtain the resolved question statement comprises:
    obtaining one or more candidate antecedents from the previous statement of the question statement, wherein each candidate antecedent is a noun or a noun phrase in the previous statement;
    scoring each of the one or more candidate antecedents by using a resolution model to obtain a score of each candidate antecedent, wherein the resolution model comprises a neural network;
selecting, from the one or more candidate antecedents, candidate antecedents whose scores are higher than a first threshold; and
resolving the to-be-resolved item in the question statement by using a candidate antecedent with a highest score from among the candidate antecedents whose scores are higher than the first threshold to obtain the resolved question statement.

4. The method according to claim 1, wherein the determining that the body of the sentence pattern of the question statement is the proper subset of the previous statement comprises:
extracting a stem sentence component of the previous statement and the stem sentence component of the question statement; and
determining that a non-noun phrase part in the stem sentence component of the question statement is the proper subset of the stem sentence component of the previous statement.

5. The method according to claim 1, wherein the determining whether the notional word that is in the question statement and that is corresponding to the attribute word is ellipted comprises:
removing a meaningless word from a sentence head of the question statement to obtain a processed question statement;
determining whether a sentence head word in the processed question statement is the attribute word; and
in response to the sentence head word in the processed question statement being the attribute word, determining that the notional word that is in the question statement and that is corresponding to the attribute word is ellipted.

6. The method according to claim 1, wherein the determining that the general component in the question statement is ellipted comprises:
obtaining a part-of-speech number sequence and a word number sequence of the question statement, wherein the word number sequence comprises a number corresponding to each word in the question statement and the part-of-speech number sequence comprises a number corresponding to a part of speech of each word in the question statement; and
inputting the word number sequence and the part-of-speech number sequence into a second sequence labeling model for calculation to obtain location information of the ellipted general component in the question statement, wherein the second sequence labeling model comprises a neural network.

7. The method according to claim 1, wherein complementing the ellipted component based on the historical dialog statement to obtain the question statement after ellipsis resolution comprises:
retaining an overall structure of the previous statement and replacing the phrase in the previous statement with the phrase in the question statement to obtain the question statement after ellipsis resolution,
wherein there is the same-type relationship between the phrase in the previous statement and the phrase in the question statement.

8. A missing semantics complementing apparatus, comprising:
a memory, configured to store instructions; and
at least one processor coupled to the memory,
wherein in response to the at least one processor executing the instructions, the following steps are performed:
obtaining a historical dialog statement and a question statement input by a user;
obtaining location information of a to-be-resolved item in the question statement, and resolving the to-be-resolved item in the question statement based on the historical dialog statement and the location information of the to-be-resolved item, to obtain a resolved question statement, wherein the location information is obtained based on a first sequence labeling model that comprises a neural network;
determining that a component in the question statement is ellipted, and in response to determining that a component in the question statement is ellipted, complementing the ellipted component based on the historical dialog statement, to obtain a question statement after ellipsis resolution;
merging the resolved question statement and the question statement after ellipsis resolution, to obtain a merged question statement; and
determining a target complemented question statement from the resolved question statement, the question statement after ellipsis resolution, and the merged question statement in the resolved question statement, wherein the target complemented question statement is a question statement with a highest stem sentence integrity degree and a highest probability that all words in a sentence form one sentence selected from one of the resolved question statement, the question statement after ellipsis resolution, and the merged question statement,
wherein the historical dialog statement comprises a previous statement to the question statement,
wherein the determining that the component in the question statement is ellipted comprises:
determining that a stem sentence component in the question statement is ellipted,
determining that a notional word that is in the question statement and corresponds to an attribute word is ellipted, or
determining that a general component in the question statement is ellipted; and
wherein determining that the stem sentence component in the question statement is ellipted comprises:
determining that a sentence pattern of the question statement and a sentence pattern of the previous statement meet a preset condition or determining that a body of the sentence pattern of the question statement is a proper subset of the previous statement;
in response to determining that the sentence pattern of the question statement and the sentence pattern of the previous statement meet the preset condition or determining that the body of the sentence pattern of the question statement is the proper subset of the previous statement, determining whether there is a same-type relationship between a phrase in the question statement and a phrase in the previous statement; and
in response to there being the same-type relationship between the phrase in the question statement and the phrase in the previous statement, determining that the stem sentence component in the question statement is ellipted.

9. The apparatus according to claim 8, wherein when performing the step of the obtaining location information of the to-be-resolved item in the question statement, the processor performs the following steps:

obtaining a word number sequence and a part-of-speech number sequence of the question statement, wherein the word number sequence comprises a number corresponding to each word in the question statement, and the part-of-speech number sequence comprises a number corresponding to a part of speech of each word in the question statement; and inputting the word number sequence and the part-of-speech number sequence of the question statement into the first sequence labeling model for calculation, to obtain the location information of the to-be-resolved item.

10. The apparatus according to claim 8, wherein when performing the step of the resolving the to-be-resolved item in the question statement based on the historical dialog statement and the location information of the to-be-resolved item, to obtain the resolved question statement, the processor performs the following steps:

obtaining one or more candidate antecedents from the previous statement of the question statement, wherein each candidate antecedent is a noun or a noun phrase in the previous statement;

scoring each of the one or more candidate antecedents by using a resolution model, to obtain a score of each candidate antecedent, wherein the resolution model comprises a neural network;

selecting, from the one or more candidate antecedents, candidate antecedents whose scores are higher than a first threshold; and resolving the to-be-resolved item in the question statement by using a candidate antecedent with a highest score from the candidate antecedents whose scores are higher than the first threshold, to obtain the resolved question statement.

11. The apparatus according to claim 8, wherein when performing the step of determining that the stem sentence component of the question statement is the proper subset of the previous statement, the processor performs the following steps:

extracting a stem sentence component of the previous statement and the stem sentence component of the question statement; and determining that a non-noun phrase part in the stem sentence component of the question statement is the proper subset of the stem sentence component of the previous statement.

12. The apparatus according to claim 8, wherein when performing the step of the determining that the notional word that is in the question statement and that is corresponding to the attribute word is ellipted, the processor performs the following steps:

removing a meaningless word from a sentence head of the question statement, to obtain a processed question statement;

determining whether a sentence head word in the processed question statement is the attribute word; and in response to the sentence head word in the processed question statement being the attribute word, determining that the notional word that is in the question statement and that is corresponding to the attribute word is ellipted.

13. The apparatus according to claim 8, wherein when performing the step of the determining that the general component in the question statement is ellipted, the processor performs the following steps:

obtaining a part-of-speech number sequence and a word number sequence of the question statement, wherein the word number sequence comprises a number corresponding to each word in the question statement, and the part-of-speech number sequence comprises a number corresponding to a part of speech of each word in the question statement; and inputting the word number sequence and the part-of-speech number sequence a second sequence labeling model for calculation, to obtain location information of the ellipted general component in the question statement, wherein the second sequence labeling model comprises a neural network.

14. The apparatus according to claim 8, wherein in response to performing the step of complementing the ellipted component based on the historical dialog statement to obtain the question statement after ellipsis resolution, the processor performs the following steps:

retaining an overall structure of the previous statement and replacing the phrase in the previous statement with the phrase in the question statement to obtain the question statement after ellipsis resolution, wherein there is the same-type relationship between the phrase in the previous statement and the phrase in the question statement.

\* \* \* \* \*

UNITED STATES PATENT AND TRADEMARK OFFICE
CERTIFICATE OF CORRECTION

| | | |
|---|---|---|
| PATENT NO. | : 12,135,941 B2 | Page 1 of 1 |
| APPLICATION NO. | : 17/530197 | |
| DATED | : November 5, 2024 | |
| INVENTOR(S) | : Zeng et al. | |

It is certified that error appears in the above-identified patent and that said Letters Patent is hereby corrected as shown below:

On the Title Page

Page 2: item (56) References Cited, Foreign Patent Documents: "IN108647207 A" should read as -- CN108647207 A --.

Signed and Sealed this
Third Day of June, 2025

Coke Morgan Stewart
*Acting Director of the United States Patent and Trademark Office*